(12) United States Patent
Ahn et al.

(10) Patent No.: US 9,609,381 B2
(45) Date of Patent: Mar. 28, 2017

(54) METHOD FOR PLAYING CONTENTS

(75) Inventors: Eun Seon Ahn, Pyeongtaek-si (KR);
Jae Uk Kim, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 355 days.

(21) Appl. No.: 12/785,881

(22) Filed: May 24, 2010

(65) Prior Publication Data
US 2011/0119611 A1 May 19, 2011

(30) Foreign Application Priority Data
Nov. 17, 2009 (KR) .................. 10-2009-0110763

(51) Int. Cl.
| | |
|---|---|
| *H04N 21/431* | (2011.01) |
| *G06F 3/0346* | (2013.01) |
| *G06F 3/0486* | (2013.01) |
| *H04N 5/445* | (2011.01) |
| *H04N 21/443* | (2011.01) |
| *H04N 21/485* | (2011.01) |

(52) U.S. Cl.
CPC ........ *H04N 21/4314* (2013.01); *G06F 3/0346* (2013.01); *G06F 3/0486* (2013.01); *H04N 5/44591* (2013.01); *H04N 21/4316* (2013.01); *H04N 21/4438* (2013.01); *H04N 21/4858* (2013.01)

(58) Field of Classification Search
CPC ............. G06F 3/0486; G06F 3/04817; H04N 21/4312; H04N 21/482
USPC ......................................... 715/769; 345/655
See application file for complete search history.

(56) References Cited

U.S. PATENT DOCUMENTS

| | | | |
|---|---|---|---|
| 4,435,086 A | 3/1984 | Kato | |
| 5,802,492 A | 9/1998 | DeLorme et al. | |
| 5,815,145 A | 9/1998 | Matthews, III | |
| 6,307,573 B1 | 10/2001 | Barros | |
| 6,359,636 B1 | 3/2002 | Schindler et al. | |
| 6,456,334 B1* | 9/2002 | Duhault | 348/565 |
| 6,481,011 B1 | 11/2002 | Lemmons | |
| 6,629,104 B1 | 9/2003 | Parulski et al. | |
| 6,703,947 B1 | 3/2004 | Wallner | |
| 7,751,971 B2 | 7/2010 | Chang et al. | |
| 7,818,116 B1 | 10/2010 | Nesbitt | |
| 7,894,984 B2 | 2/2011 | Rasmussen et al. | |

(Continued)

FOREIGN PATENT DOCUMENTS

| | | |
|---|---|---|
| CN | 1219322 | 6/1999 |
| CN | 101262668 | 9/2008 |

(Continued)

OTHER PUBLICATIONS

U.S. Office Action issued in U.S. Appl. No. 12/785,815 dated Mar. 15, 2012.

(Continued)

*Primary Examiner* — Christopher J Fibbi
(74) *Attorney, Agent, or Firm* — Ked & Associates LLP

(57) ABSTRACT

A method for playing contents is provided. In the method, information corresponding, respectively, to a plurality of contents may be displayed, and a drag and drop operation related to first contents information and second contents information among the displayed contents information may be received. Thereafter, the first contents and the second contents may be played.

12 Claims, 26 Drawing Sheets

(56) References Cited

U.S. PATENT DOCUMENTS

| | | | |
|---|---|---|---|
| 8,490,124 B2* | 7/2013 | Michael et al. | 725/14 |
| 8,681,175 B2 | 3/2014 | Ahn et al. | |
| 2001/0029610 A1 | 10/2001 | Corvin et al. | |
| 2001/0054183 A1 | 12/2001 | Curreri | |
| 2003/0182052 A1 | 9/2003 | DeLorme et al. | |
| 2004/0119759 A1 | 6/2004 | Barros | |
| 2004/0243307 A1 | 12/2004 | Geelen | |
| 2004/0257340 A1 | 12/2004 | Jawerth | |
| 2005/0251331 A1 | 11/2005 | Kreft | |
| 2005/0278386 A1 | 12/2005 | Kelly et al. | |
| 2006/0058952 A1 | 3/2006 | Cooper et al. | |
| 2006/0058953 A1 | 3/2006 | Cooper et al. | |
| 2006/0058961 A1 | 3/2006 | Chappell et al. | |
| 2006/0080031 A1 | 4/2006 | Cooper et al. | |
| 2006/0109145 A1 | 5/2006 | Chen | |
| 2006/0174209 A1 | 8/2006 | Barros | |
| 2006/0230356 A1 | 10/2006 | Sauve et al. | |
| 2006/0253907 A1 | 11/2006 | McConnell | |
| 2007/0050143 A1 | 3/2007 | Jones | |
| 2007/0150834 A1* | 6/2007 | Muller | G06F 3/04817 715/810 |
| 2007/0186284 A1 | 8/2007 | McConnell | |
| 2008/0016472 A1 | 1/2008 | Rohlf et al. | |
| 2008/0040678 A1 | 2/2008 | Crump | |
| 2008/0040684 A1 | 2/2008 | Crump | |
| 2008/0074550 A1* | 3/2008 | Park | 348/565 |
| 2008/0086456 A1 | 4/2008 | Rasanen et al. | |
| 2008/0104513 A1 | 5/2008 | Krogh | |
| 2008/0152297 A1* | 6/2008 | Ubillos | 386/52 |
| 2008/0172173 A1 | 7/2008 | Chang et al. | |
| 2008/0222677 A1 | 9/2008 | Woo et al. | |
| 2008/0222690 A1* | 9/2008 | Kim | 725/110 |
| 2008/0295012 A1* | 11/2008 | Sloo et al. | 715/769 |
| 2009/0015596 A1 | 1/2009 | Fuchs et al. | |
| 2009/0046110 A1 | 2/2009 | Sadler et al. | |
| 2009/0138826 A1 | 5/2009 | Barros | |
| 2009/0158185 A1 | 6/2009 | Lacevic et al. | |
| 2009/0234573 A1 | 9/2009 | Notarantonio | |
| 2010/0017733 A1 | 1/2010 | Barros | |
| 2010/0037167 A1* | 2/2010 | Son et al. | 715/769 |
| 2010/0075643 A1 | 3/2010 | Cooper et al. | |
| 2010/0095231 A1 | 4/2010 | Marlow | |
| 2010/0115554 A1* | 5/2010 | Drouet et al. | 725/41 |
| 2010/0162314 A1 | 6/2010 | Meare | |
| 2010/0162343 A1 | 6/2010 | Roberts et al. | |
| 2010/0201879 A1* | 8/2010 | VanDuyn et al. | 348/565 |
| 2011/0007076 A1 | 1/2011 | Nielsen et al. | |
| 2011/0043539 A1 | 2/2011 | Hiroki | |
| 2011/0055024 A1 | 3/2011 | Shen | |
| 2011/0282542 A9 | 11/2011 | Nielsen et al. | |

FOREIGN PATENT DOCUMENTS

| | | |
|---|---|---|
| JP | 2005-039845 | 2/2005 |
| JP | 2008-131181 | 6/2008 |
| JP | 2008-146241 | 6/2008 |
| JP | 2008-258894 | 10/2008 |
| KR | 10-2001-0040589 | 5/2001 |
| KR | 10-2006-0022448 | 3/2006 |
| KR | 10-2006-0066352 | 6/2006 |
| KR | 10-0687204 | 2/2007 |
| KR | 10-2008-0007837 | 1/2008 |
| KR | 10-2008-0081182 | 9/2008 |
| KR | 10-2008-0082351 | 9/2008 |
| KR | 10-2008-0109076 | 12/2008 |
| KR | 10-2009-0050577 | 5/2009 |
| KR | 10-2009-0084068 | 8/2009 |
| KR | 10-2009-0096831 | 9/2009 |

OTHER PUBLICATIONS

International Search Report dated Dec. 21, 2010. (PCT/KR2010/002835).
International Search Report dated Dec. 21, 2010. (PCT/KR2010/002868).
International Search Report dated Dec. 24, 2010. (PCT/KR2010/002867).
US Office Action U.S. Appl. No. 12/785,815 dated Aug. 7, 2012.
U.S. Office Action issued in U.S. Appl. No. 12/785,838 dated Jun. 26, 2012.
U.S. Office Action issued in U.S. Appl. No. 12/785,838 dated Dec. 27, 2012.
U.S. Office Action issued in U.S. Appl. No. 12/785,815 dated Jul. 18, 2013.
European Search Report dated Jul. 29, 2013.
U.S. Appl. No. 12/785,815, filed May 24, 2010, Jin Cheng Wang.
US Office Action U.S. Appl. No. 12/785,815 dated Mar. 5, 2013.
Chinese Office Action dated Apr. 24, 2014.
U.S. Office Action issued in U.S. Appl. No. 12/785,838 dated Jun. 4, 2014.
European Search Report dated Mar. 23, 2015.
Final Office Action dated Dec. 24, 2014, issued in U.S. Appl. No. 12/785,838.
U.S. Appl. No. 12/785,838, filed May 24, 2010, Michael R. Telan.
U.S. Office Action dated Jul. 30, 2015 issued in U.S. Appl. No. 12/785,838.
Korean Office Action dated Aug. 28, 2015.
Korean Office Action dated Oct. 8, 2015.
U.S. Office Action issued in U.S. Appl. No. 12/785,838 dated Feb. 11, 2016.
Chinese Search Report dated Oct. 26, 2016 issued in Application No. 2010800521210.

* cited by examiner

METHOD FOR PLAYING CONTENTS

The present application claims priority under 35 U.S.C. 119 and 35 U.S.C. 365 to Korean Patent Application No. 10-2009-0110763, filed in Korea on Nov. 17, 2009, which is hereby incorporated by reference in its entirety.

BACKGROUND

1. Field

Methods for playing contents are disclosed herein.

2. Background

Methods for playing contents are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

With the development and commercialization of digital TV technology in conventional analog broadcast, the Internet (in addition to conventional transmission media) connected to each home may be used to provide various contents services, such as real-time broadcasts, COD (Contents On Demand), games, and news to users. An IPTV (Internet Protocol TV) is an example of the contents, service based on the Internet. The IPTV transmits various information services, video contents, and broadcasts through the high-speed Internet to provide the same to televisions of users.

Figure 1:
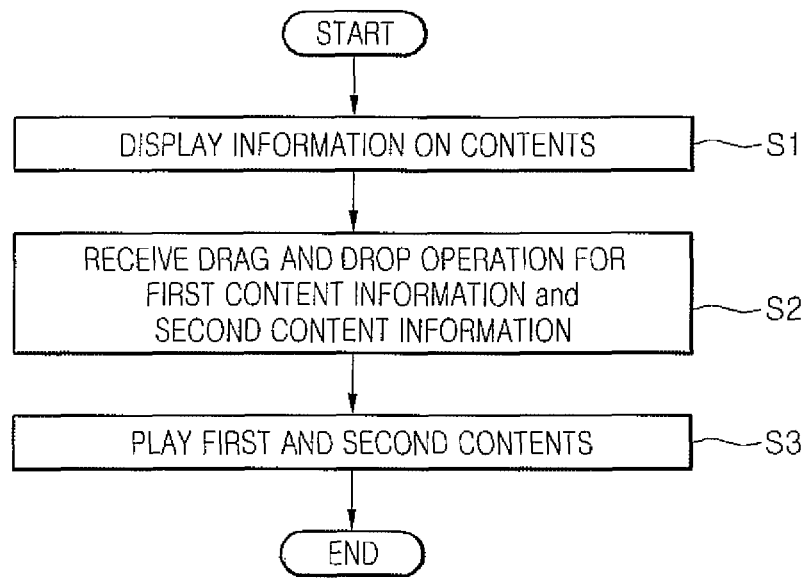
FIG. 1 is a flow chart of a contents playing method according to an embodiment.

FIG. 1 is a flow chart illustrating a contents playing method according to an embodiment. The contents playing method according to this embodiment may be performed by a contents playing device that plays contents according to external signals or internal signals. The contents may include videos and audios, and accordingly, the contents playing method according to embodiments may be performed by a display device that includes a display that displays videos and an audio output device that outputs audios. However, the contents playing method according to embodiments is not limited to being performed by a display device, but may also be performed by various other devices, such as mobile phones, smart phones, notebook computers, digital broadcast terminals, personal digital assistants (PDAs), portable multimedia players (PMPs), and navigation devices that play contents.

Referring to FIG. 1, a contents playing device may display information on a plurality of playable contents, in step S1. The playable contents may include various contents, such as real-time broadcasts, contents on demand (CODs), games, news, and video call services. The contents playing device may use wired or wireless networks, for example, the Internet, to receive signals corresponding to the contents.

There may be a plurality of contents providers corresponding to the respective contents. At a user's request, the contents playing device, for example, a display device, may access the contents providers to receive various contents, for example, real-time broadcasts, CODs, games, videos, pictures, weather information, news, and video call services, from the contents providers.

Also, in step S1, the contents playing device may display information on the contents on a screen in the shape of characters and/or images. For example, the displayed contents information may be characters including contents-related information, such as titles, identification (ID) numbers, providers and content of the contents, and/or images representing the contents. The contents information may include information that enables the user to identify the respective contents and detect the respective contents in brief.

Figure 2:
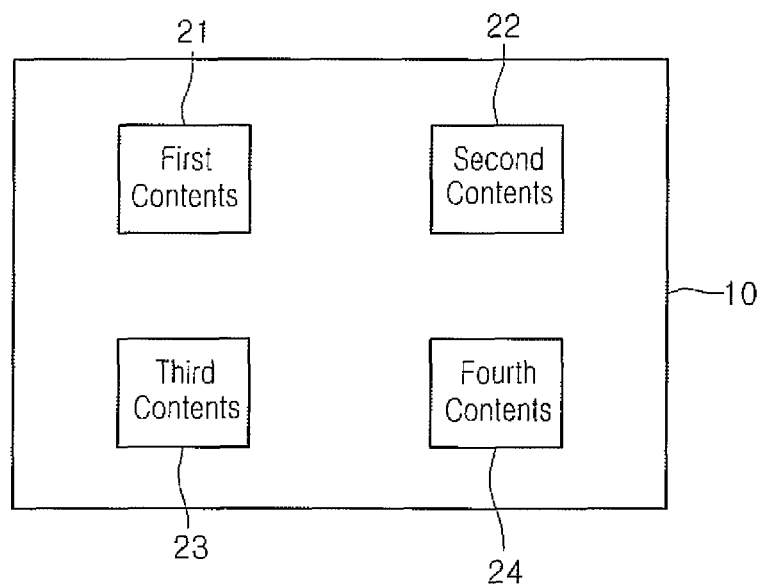
FIGS. 2 to 7 are diagrams illustrating a method for displaying a plurality of contents on a screen according to another embodiment.

FIGS. 2 to 7 are diagrams illustrating a method for displaying a plurality of contents on a screen according to an embodiment. Referring to FIG. 2, information 21, 22, 23 and 24 on or about playable contents, that is, first to fourth contents may be displayed on a screen 10. For example, the contents information 21, 22, 23 and 24 may be thumbnail images of the respective contents images.

Thereafter, the contents playing device may receive a drag and drop operation performed in relation to at least two of the displayed contents information, in step S2. The drag and drop operation may correspond to a gesture made by the user by means of an input device in a graphic user interface (GUI), which may be a GUI operation including using the input device to select and move a specific object to a specific point.

For example, the drag operation may be an operation including moving a specific object to a specific point by moving the input device while pressing a specific button of the input device. The drop operation may be an operation including dropping the specific object at the specific point. by releasing the specific button pressed for the drag operation.

More specifically, the drag and drop operation may be performed by using the input device to select an object located at a point of or on the screen and drag and drop the selected object at another point of or on the screen. In this case, an operation corresponding to the drop point of the object may be performed.

The drag and drop operation may be performed using an intuitive graphic interface. As described above, the drag and drop operation enables the user to perform a desired operation on a specific object. Thus, the drag and drop operation may be a useful operation to which the user may easily adapt.

According to one embodiment, the user may perform the drag and drop operation on the first contents information and the second contents information by means of the input device, among the contents information displayed on the screen. The input device for the drag and drop operation may be a remote controller, which may be connected to the contents playing device in a wired or wireless manner, or may be a device that senses motion of a body portion, for example, a user's finger or eye(s).

For example, the remote controller may be an input device, such as a mouse or a spatial remote controller, that detects a user's gesture or motion and transmits the corresponding signal to the contents playing device. Also, the contents playing device may have a touch panel that detects a point touched by a specific object or a motion of the touch point of the specific object, to enable the user to perform the drag and drop operation by touching the screen with his finger or a specific object. The contents playing device may have a sensor capable of sensing motion of the user's eye, to receive the above drag and drop operation according to the motion of the user's eye.

Figure 3:
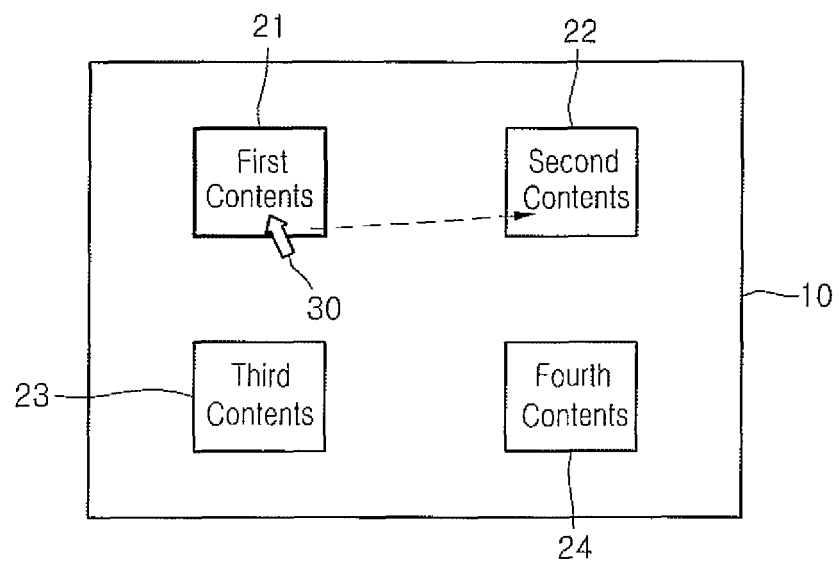

Referring to FIG. 3, a pointer 30 that moves in correspondence to a motion of the input device may be displayed on the screen 10 having the contents information 21, 22, 23 and 24 displayed thereon, to indicate a location to which the user points by means of the input device. By means of the input device, the user may select the first contents information 21 among the displayed contents information and drag or move the same in a specific direction, for example, a direction (indicated by the dotted arrow in FIG. 3) toward the second contents information 22. By the above drag operation, the first contents information 21 may move toward the second contents information 22 together with the movement of the pointer 30.

Figure 4:
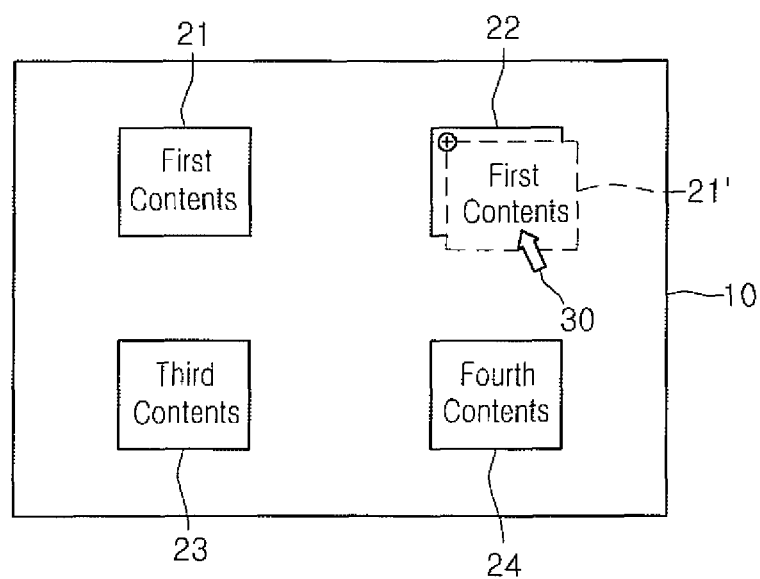
Figure 5:
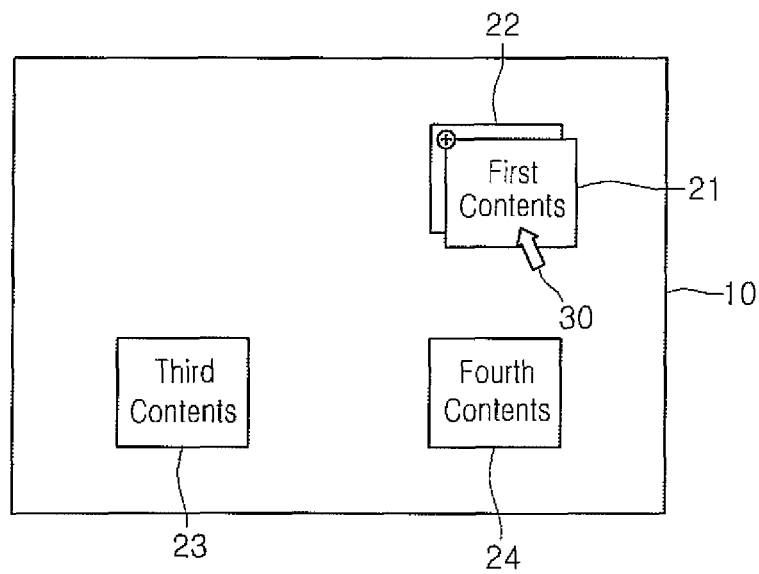

As illustrated in FIG. 4, a virtual image 21' corresponding to the first contents information 21 may be created when the user starts to select and drag the first contents information 21 by means of the input device, and the virtual image 21' of the first contents information 21 may move to a display region of the second contents information 22 when the user moves the input device to move the pointer 30. As illustrated in FIG. 5, when the user moves the pointer 30 by means of the input device, the first contents information 21 displayed on the screen 10 may move to the display region of the second contents information 22.

Dragging the contents information may include not only dragging and moving the contents information displayed on the screen 10, but also dragging and moving a virtual image corresponding to the contents information. That is, when the first contents information 21 is dragged by the user, the first contents information 21 displayed on the screen 10 may move in a specific direction or the virtual image 21' of the first contents information 21 may move in a specific direction.

After dragging and moving the first contents information 21 to the display region of the second contents information 22, the user may drop the first contents information 21 at the display region of the second contents information 22. Dropping the contents information at a specific region may mean moving and dropping a predetermined point of the displayed contents information in the specific region. That is, as illustrated in FIGS. 4 and 5, dropping a specific point, for example, a left edge point 26, of the first contents information 21 in the display region of the second contents information 22 may be set as dropping the first contents information 21 at or in the display region of the second contents information 22.

Figure 6:
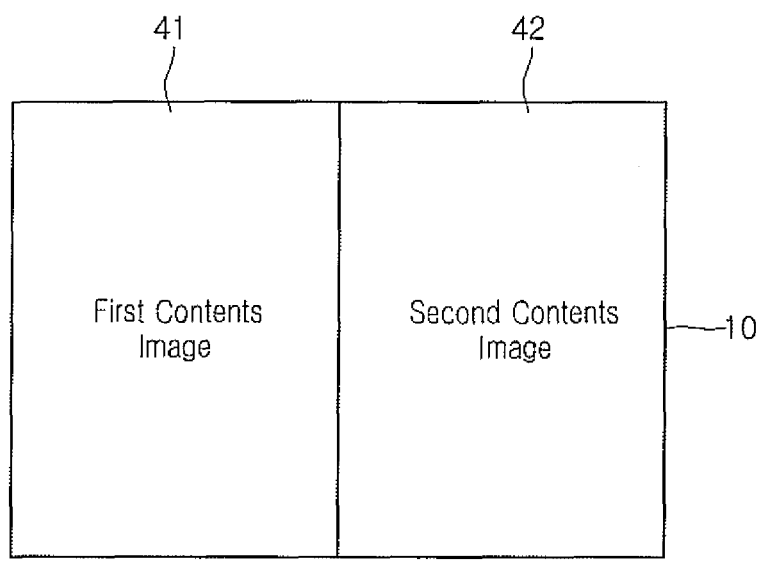

As described above, a drag and drop operation on the first contents information 21 and the second contents information 22 may be performed by one connected operation. The contents playing device may play the first contents and the second contents in response to the above drag and drop operation on the first contents information 21 and the second contents information 22, in step S3 of FIG. 1. Referring to FIG. 6, by the above drag and drop operation, an image 41 of the first contents 21 and an image 42 of the second contents 22 may be displayed on the screen 10, for example, simultaneously.

According to another embodiment, a plurality of contents, for example, the first contents and the second contents may be simultaneously displayed as described above by another user input operation other than the above drag and drop operation discussed above. For example, the user may use a navigation key, that is, up, down, left, and right keys, of the input device to select the first contents information 21 and the second contents information 22 displayed on the screen 10, to display an image 41 of the first contents and an image 42 of the second contents on the screen 10, for example, simultaneously.

More specifically, the user may select the first contents information 21 displayed on the screen 10 by means of the up, down, left, and right keys, and then may select the second contents information 22 displayed on the screen 10 by means of the right key. Accordingly, an image 41 of the first contents and an image 42 of the second contents may be simultaneously displayed on the screen 10, as illustrated in FIG. 6.

Figure 7:
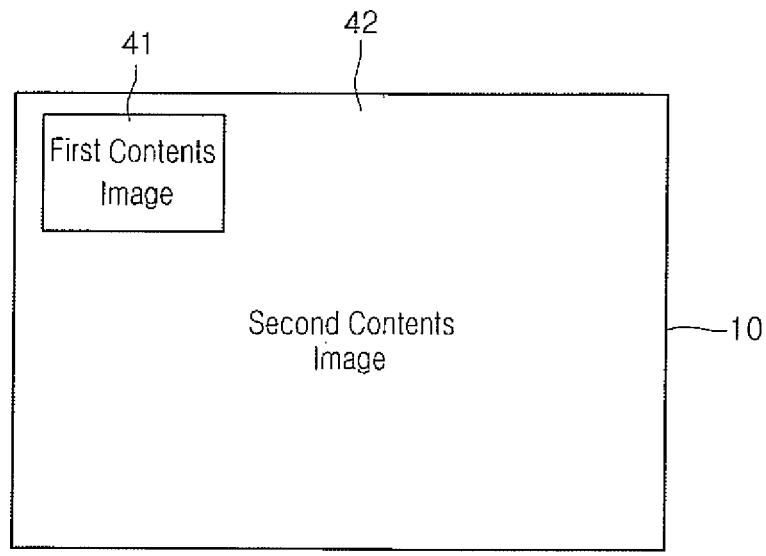

The first contents image 41 and the second contents image 42 may be displayed on the screen 10 in different sizes, and their display locations may be different from each other. That is, according to one embodiment, one of the first contents image 41 or the second contents image 42 displayed by the above drag and drop operation may be displayed in or on a main screen displayed throughout or substantially equivalent in size to the screen 10, and the other may be displayed in a sub screen smaller than the main screen. Referring to FIG. 7, on the screen 10, the second contents image 42 may be displayed in or on a main screen and the first contents image 41 may be displayed in a sub screen smaller than the main screen.

More specifically, in the drag and drop operation described with reference to FIGS. 3 to 5, an image corresponding to the dragged object may be displayed in a sub screen and an image corresponding to the drop region may be displayed in a main screen. That is, as illustrated in FIG. 7, the image 41 of the first contents information dragged by the user may be displayed in a sub screen, and the image 42 of the second contents information corresponding to the drop region of the first contents information 21 may be displayed in a main screen. Alternatively, in contrast to the method for determination of the main screen and the sub screen described with reference to FIG. 7, the first contents image 41 dragged by the user may be displayed in the main screen and the second contents image 42 corresponding to the drop region of the first contents information 21 may be displayed in the sub screen.

According to still another embodiment, among the first and second contents images 41 and 42, the image to be displayed in the main screen and the image to be displayed in the sub screen may be determined according to a drop location of the first contents information 21 in the display region of the second contents information 22. For example, the display region of the second contents information 22 may be divided into two upper and lower or left and right regions, and the main-screen image and the sub-screen image may be determined according to the drop location of the first contents information 21 in the two regions.

More specifically, if the first contents information 21 is dropped at an upper portion of the display region of the second contents information 22, the first contents image 41 may be displayed in the full screen and the second contents image 42 may be display in the sub screen. On the other hand, if the first contents information 21 is dropped at a lower portion of the display region of the second contents information 22, the second contents image 42 may be displayed in the full screen and the first contents image 41 may be display in the sub screen.

Figure 8:
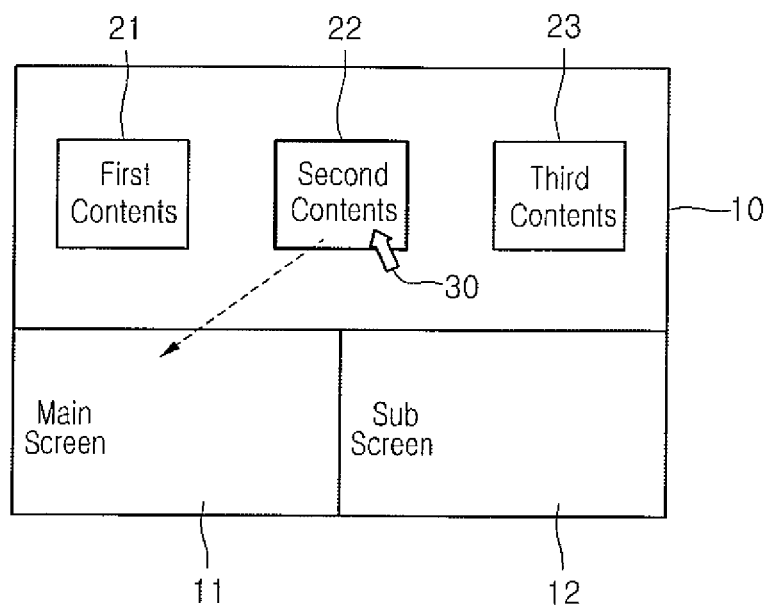
FIGS. 8 to 11 are diagrams illustrating a method for displaying a plurality of contents on a screen according to another embodiment.

FIGS. 8 to 11 are diagrams illustrating a method for displaying a plurality of contents on a screen according to another embodiment. Referring to FIG. 8, regions 11 and 12 and information 21, 22, and 23 corresponding to contents may be displayed on a screen 10. For example, the regions 11 and 12 may be a main-screen region 11 and a sub-screen region 12 where dragged contents information may be dropped for play of contents.

Figure 9:
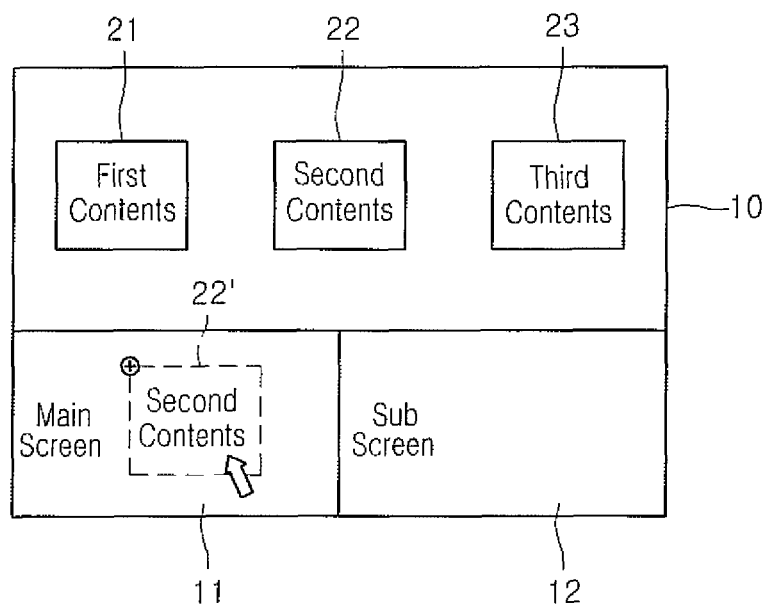
Figure 10:
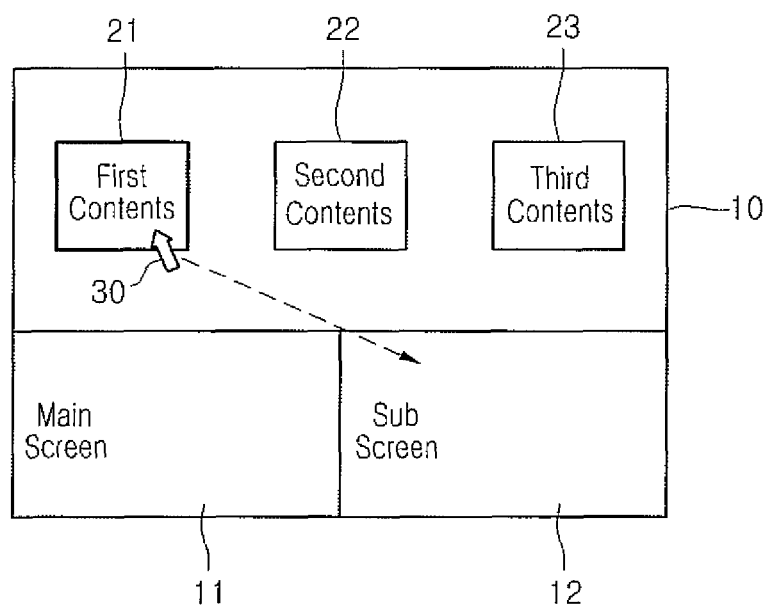
Figure 11:
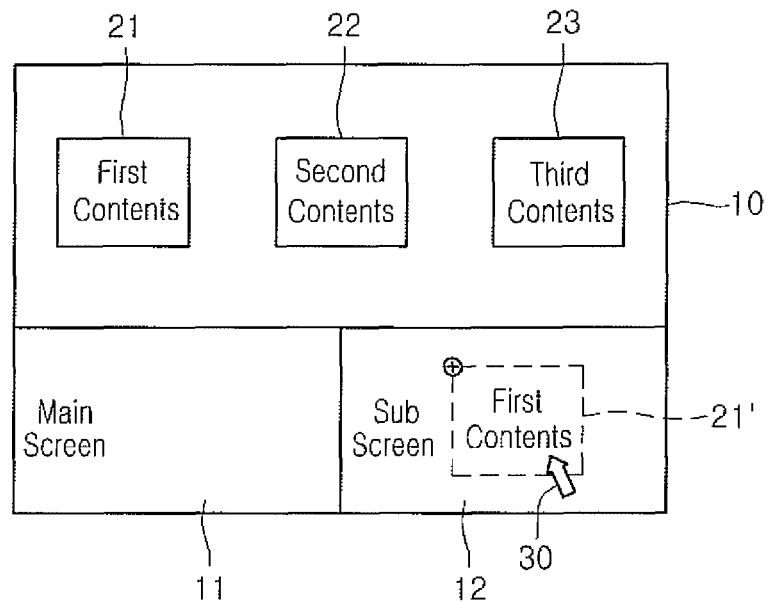

The user may drag information corresponding to desired contents among the contents and drop the same at one of the regions 11 and 12, so that the dragged contents may be displayed at a location of the screen 10 corresponding to the drop region. The user may drag and drop the second contents information 22 in the main-screen region 11, as illustrated in FIGS. 8 and 9, and may drag and drop the first contents information 21 in the sub-screen region 12, as illustrated in FIGS. 10 and 11.

In response to the above described drag and drop operation, the contents playing device may display the second contents image 42 in a main screen and display the first contents image 41 in a sub screen, as illustrated in FIG. 7. More specifically, as illustrated in FIGS. 8 to 11, the user may drag and drop the first and second contents information 21, 22 in the main-screen and sub-screen regions 11, 12 and press a contents play button, so that the first and second contents image 41, 42 may be displayed in the main-screen and sub-screen regions 11, 12 of the screen 10.

Figure 12:
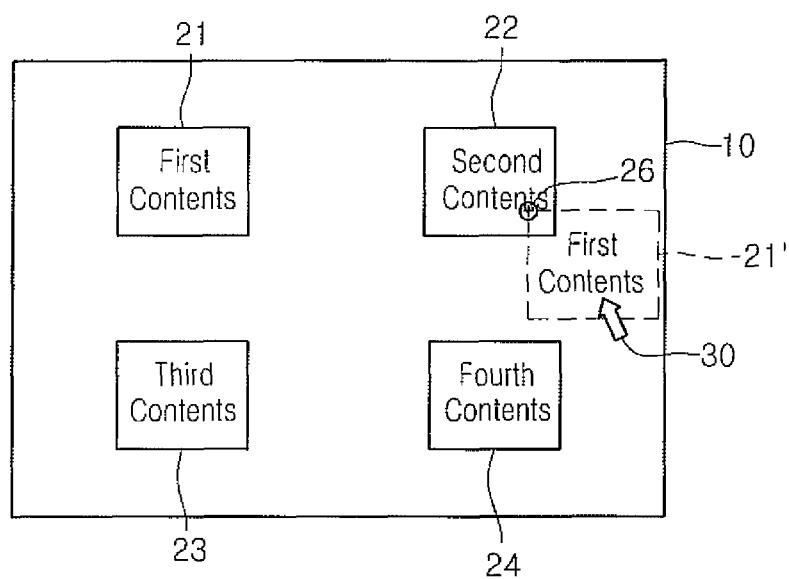
FIGS. 12 and 13 are diagrams illustrating a method for displaying a plurality of contents on a screen according to another embodiment.
Figure 13:
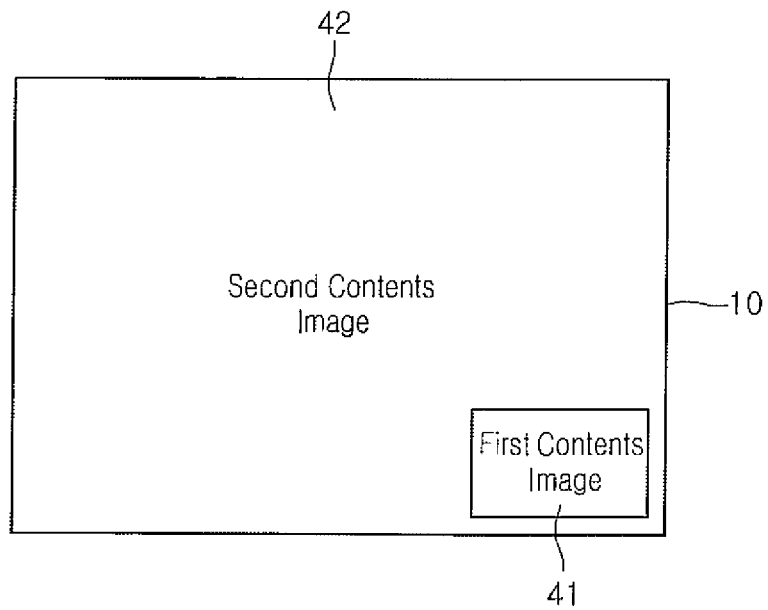

FIGS. 12 and 13 are diagrams illustrating a method for displaying a plurality of contents on a screen according to another embodiment. According to this embodiment, a display location of contents on the screen 10 may vary depending on a drop location of the corresponding contents information.

For example, in dragging and dropping the first contents information 21 in the display region of the second contents information 22, the display location of the first contents image 41 on the screen 10 may vary depending on the drop location of the first contents information 21. As illustrated in FIG. 12, when the user drags and drops the first contents information 21 at or to a right bottom portion of the display region of the second contents information 22, the first contents image 41 may be displayed in a right bottom region of the screen 10.

That is, as illustrated in FIG. 13, the second contents image 42 may be displayed in a main screen, and a sub screen displaying the first contents image 41 may be located at a right bottom region of the screen 10. If the first contents information 21 is dropped at a left top portion of the display region of the second contents information 22, as illustrated in FIG. 4, the sub screen displaying the first contents image 41 may be located at a left top region of the screen 10, as illustrated in FIG. 7.

As described above, the user may set the location of the sub screen displaying the contents, by dropping the corresponding contents information at a specific location. The drop location of the contents information may be determined by a specific point of the contents information. For example, as illustrated in FIG. 12, the drop location of the first contents information 21 may be determined by a left top edge point 26 of the first contents information 21.

FIGS. 14 to 25 are diagrams illustrating a method for controlling a plurality of contents displayed on a screen according to another embodiment. According to this embodiment, the user may use the above drag and drop operation to convert between the contents displayed, respectively, in the main screen and the sub screen.

Figure 14:
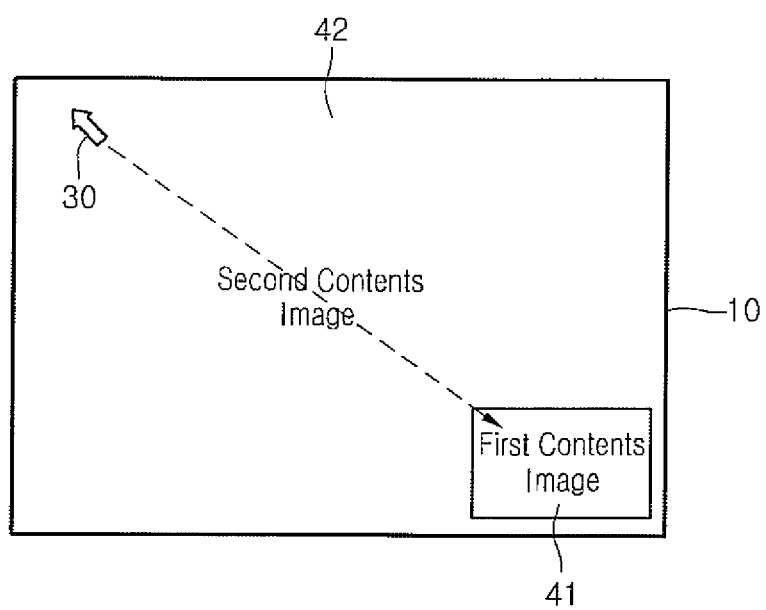
FIGS. 14 to 25 are diagrams illustrating a method for displaying a plurality of contents displayed on a screen according to another embodiment.
Figure 15:
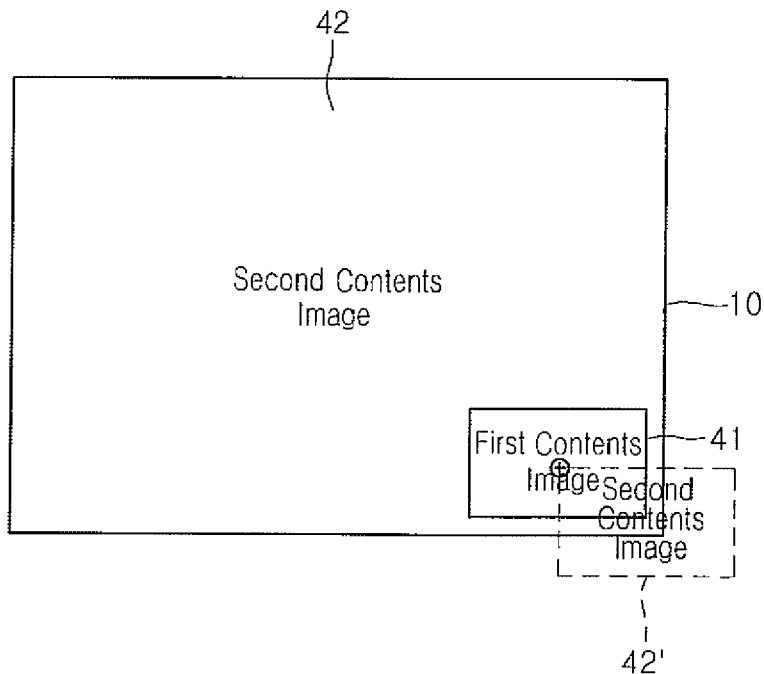
Figure 16:
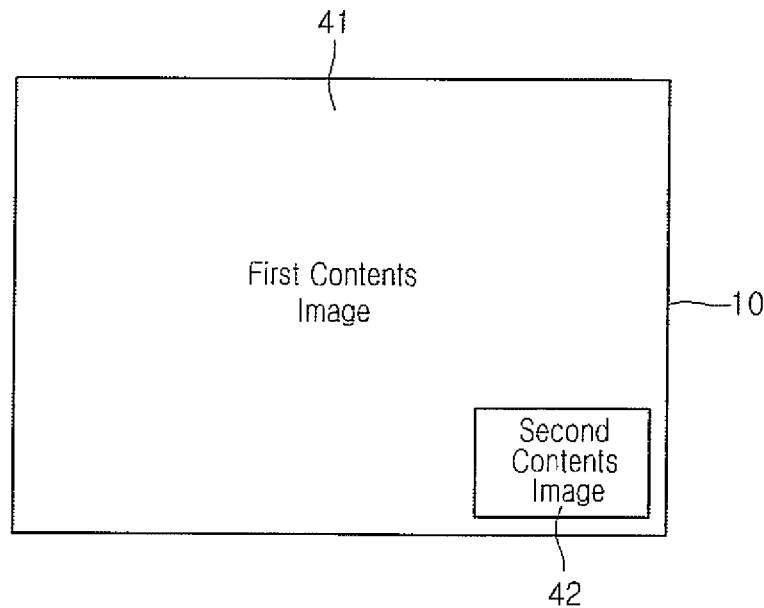

Referring to FIGS. 14 and 15, the user may select the second contents image 42 displayed in the main screen, and drag and drop the same at the sub-screen region displaying the first contents image 41. In this case, as illustrated in FIG. 16, the main screen may be converted into the sub screen, so that the first contents image 41 may be displayed in the main screen and the second contents image 42 may be displayed in the sub screen.

Figure 17:
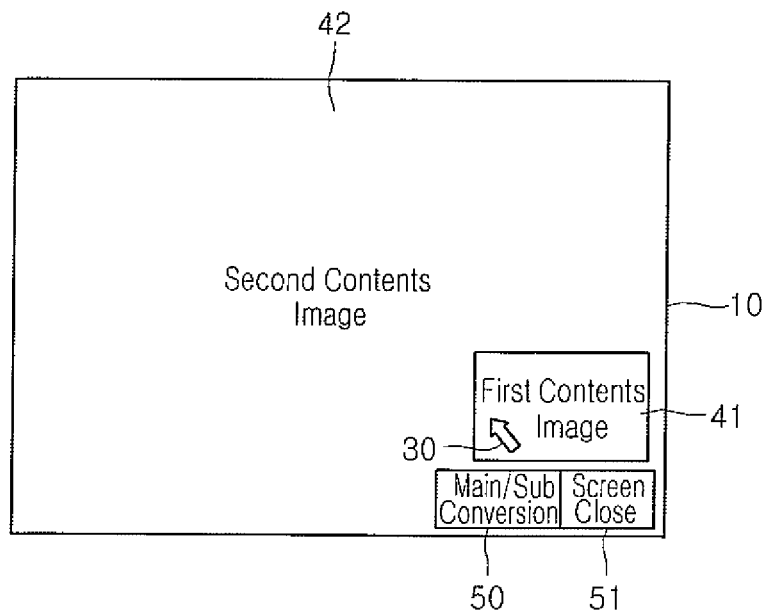
Figure 18:
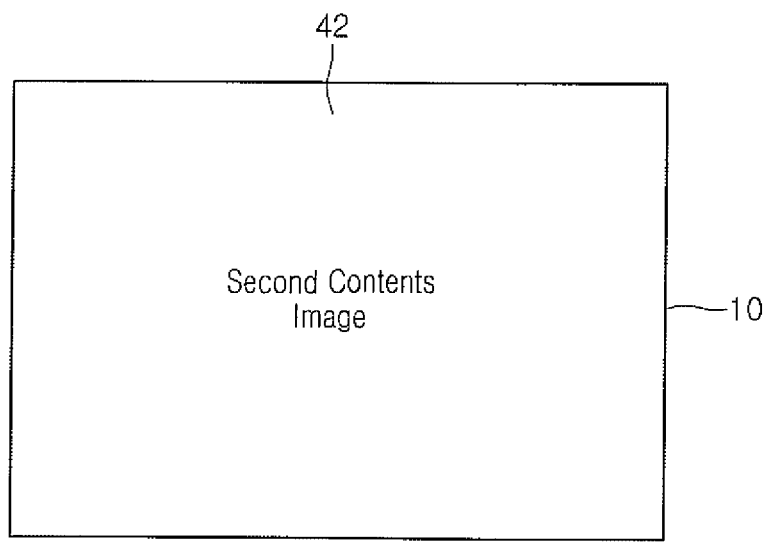

As illustrated in FIG. 17, when the user moves the pointer 30 to the sub-screen region displaying the first contents image 41, a 'main/sub conversion' button 50 for conversion between the main screen and the sub screen and a 'screen close' button 51 for closing of the sub screen may be displayed. In this case, when the 'main/sub conversion' button 50 is selected by the user, the contents of the main screen and the sub screen may be converted therebetween, as illustrated in FIG. 16, and when the 'screen close' button is selected by the user, the display of the sub screen corresponding to the first contents image 41 may be closed, as illustrated in FIG. 18. The user may select the contents image, displayed in the main screen or the sub screen on the screen 10, to display the selected image in the full screen.

Figure 19:
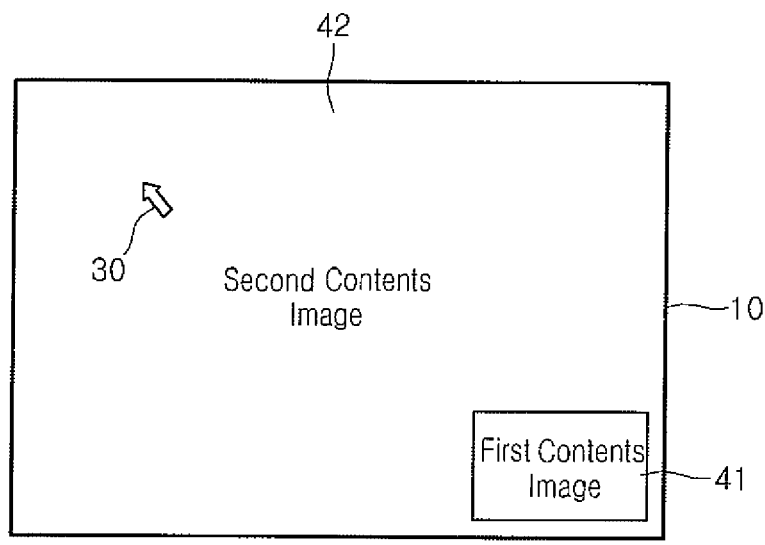
Figure 20:
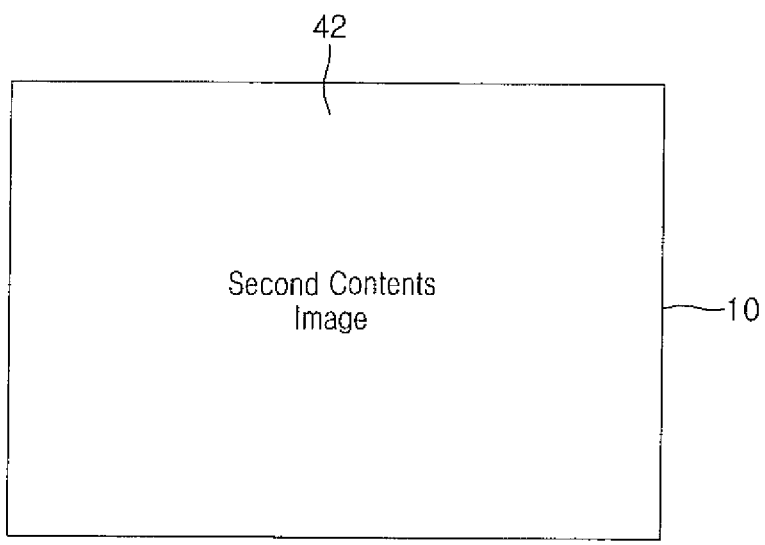

Referring to FIG. 19, the user may select the second contents image 42, displayed in the main screen, to display the second contents image 42 in the full screen. In this case, as illustrated in FIG. 20, the display of the sub screen corresponding to the first contents image 41 may be closed and the second contents image 42 may be displayed in the full screen.

Figure 21:
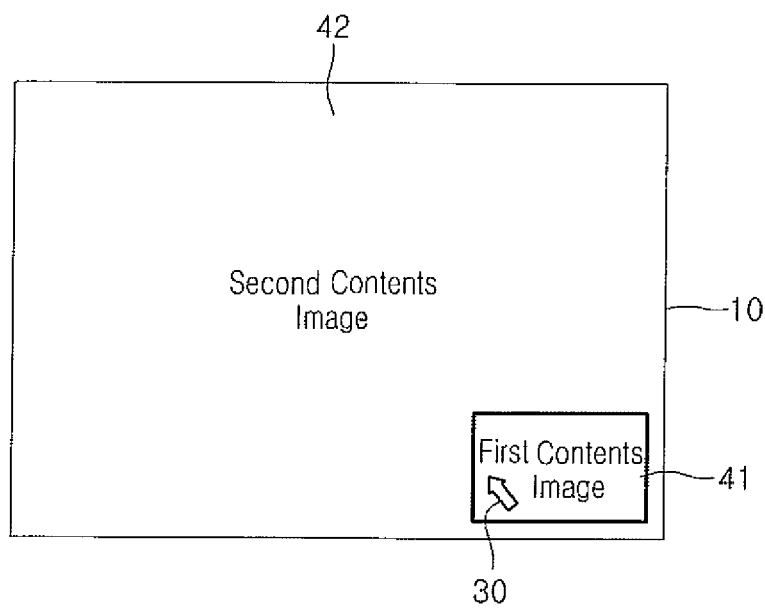
Figure 22:
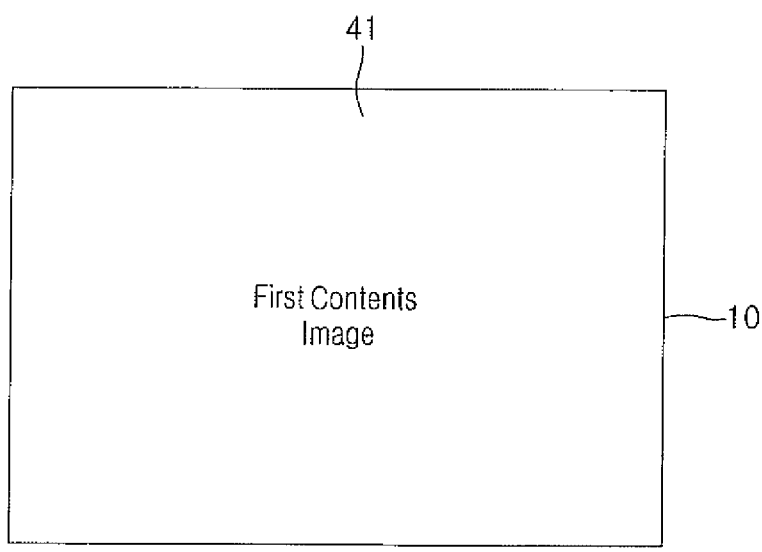

Meanwhile, referring to FIG. 21, the user may select the first contents image 41, displayed in the sub screen, to display the first contents image 41 in the full screen. In this case, as illustrated in FIG. 22, the display of the sub screen corresponding to the second contents image 42 may be closed and the first contents image 41 may be displayed in the full screen.

In the above described method, selecting a specific region or image may mean pressing a button for selection of the region or an image after the user moves the pointer 30 on or to the region or image by means of the input device. Also, the user may use the above drag and drop operation to change the location of the sub screen.

Figure 23:
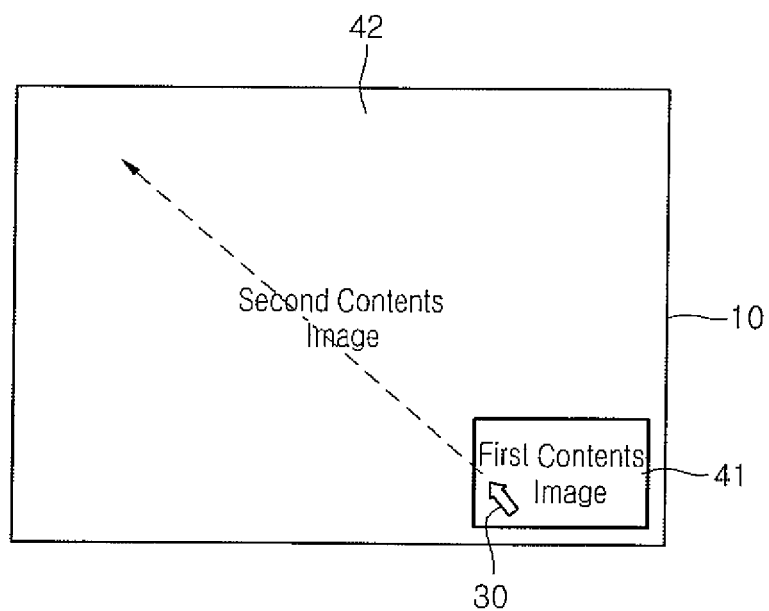
Figure 24:
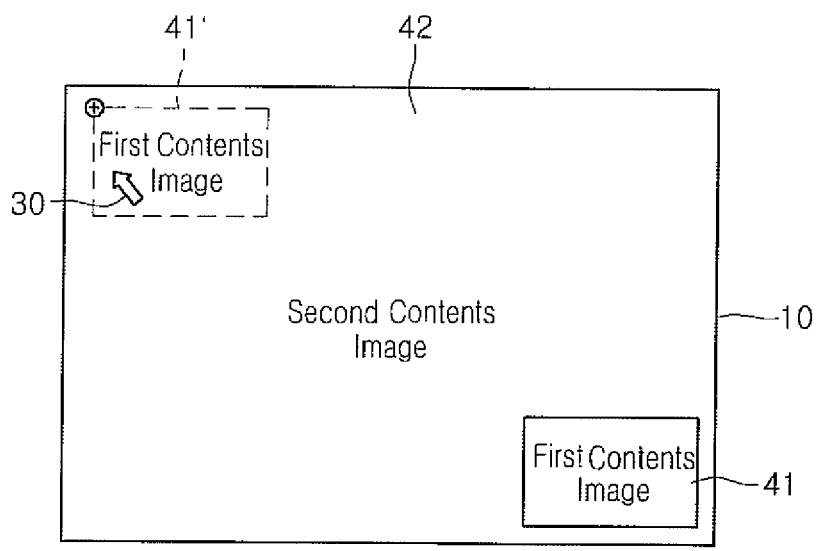
Figure 25:
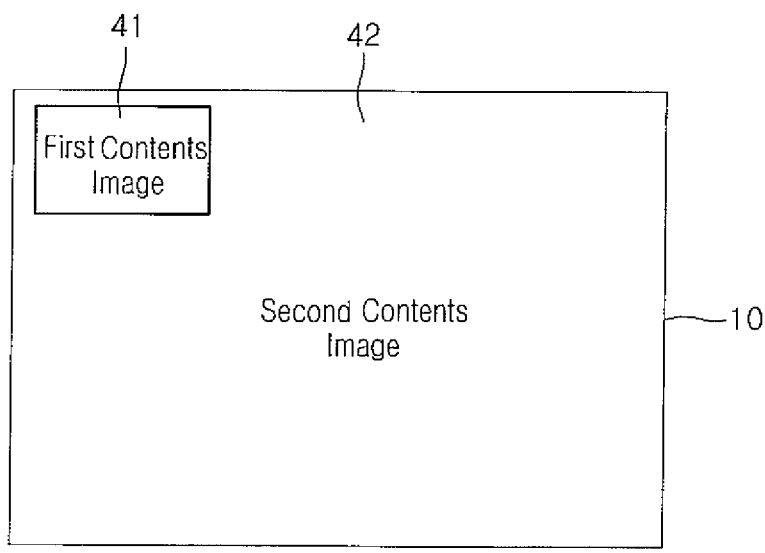

Referring to FIGS. 23 and 24, the user may drag the first contents image 41, displayed in the sub screen, and drop the same at a specific location, for example, a left top region of the screen 10. In this case, as illustrated in FIG. 25, the sub screen displaying the first contents image 41 may be disposed at the drop location, that is, the left top region of the screen 10.

FIGS. 26 to 29 are diagrams illustrating a method for displaying a plurality of contents on a screen according to another embodiment. According to this embodiment, the user may use the drag and drop operation to play three or more contents on the screen 10 simultaneously.

Figure 26:
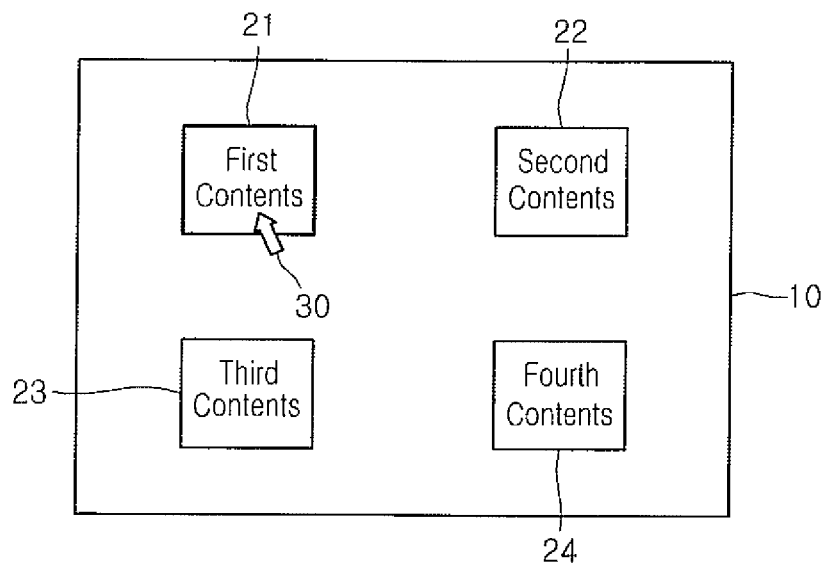
FIGS. 26 to 29 are diagrams illustrating a method for displaying a plurality of contents on a screen according to another embodiment.
Figure 27:
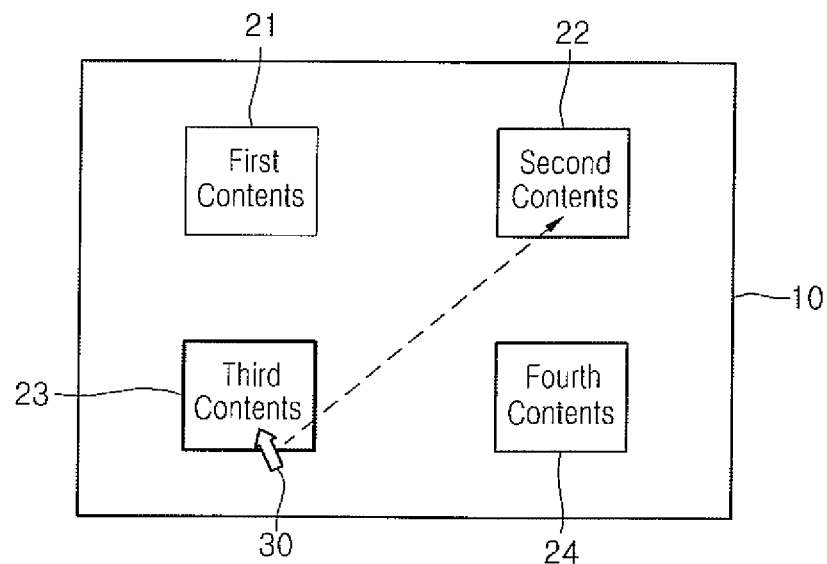

Referring to FIGS. 26 and 27, the user may select the first contents information 21 among the contents information displayed on the screen 10, and then select the third contents information 23. For example, by means of the input device, the user may select the first contents information 21 and the third contents information 23 simultaneously by moving the pointer 30 on or to the first contents information 21 and then moving the pointer 30 on or to the third contents information 23 while pressing a button for selection of another contents information.

Figure 28:
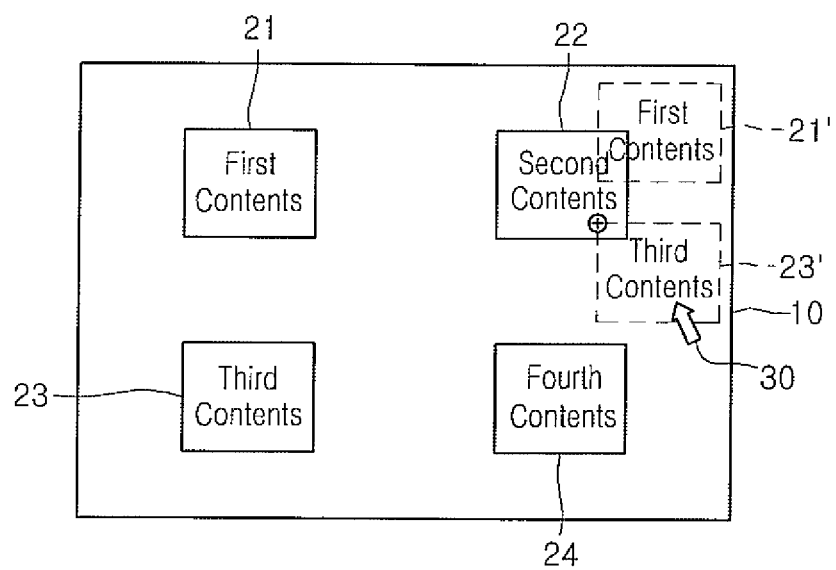
Figure 29:
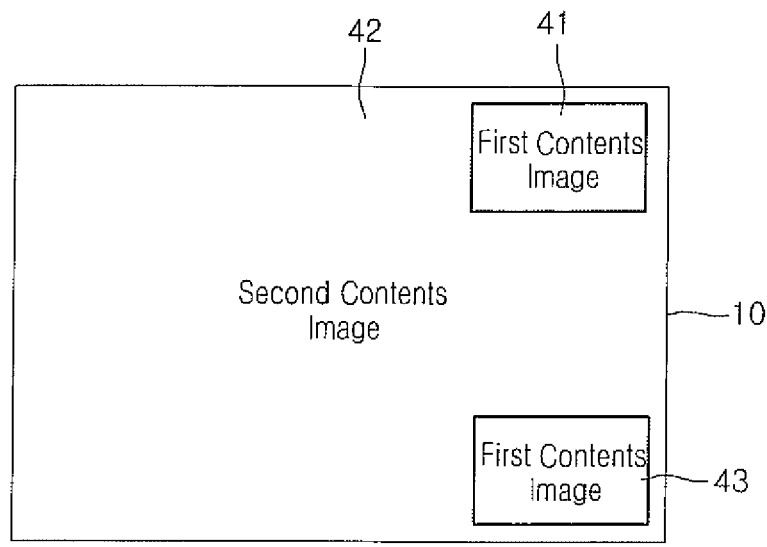

Thereafter, as illustrated in FIG. 28, the user may drag the first contents information 21 and the third contents information 23 simultaneously and drop the same in the display region of the second contents information 22. By the above drag and drop operation, the images of the first, second, and third contents may be displayed on the screen 10, for example, simultaneously. That is, as illustrated in FIG. 29, the second contents image 42 corresponding to the drop region of the first and third contents information 21 and 23 may displayed in or on the main screen, and the first contents image 41 and the third contents image 43 may be displayed in or on the sub screen.

Locations of the sub screens corresponding, respectively, to the first and third contents images 41 and 43 may be determined according to the drop locations of the first and third contents information 21 and 23. That is, if the first contents 21 is located higher than the third contents information 23 and the drop location thereof is at a right side of the display region of the second contents information 22, as illustrated in FIG. 28, the sub screen of the first contents image 41 may be located in a right top region of the screen 10 and the sub screen of the third contents image 43 may be located in a right bottom region of the screen 10, as illustrated in FIG. 29.

Figure 30:
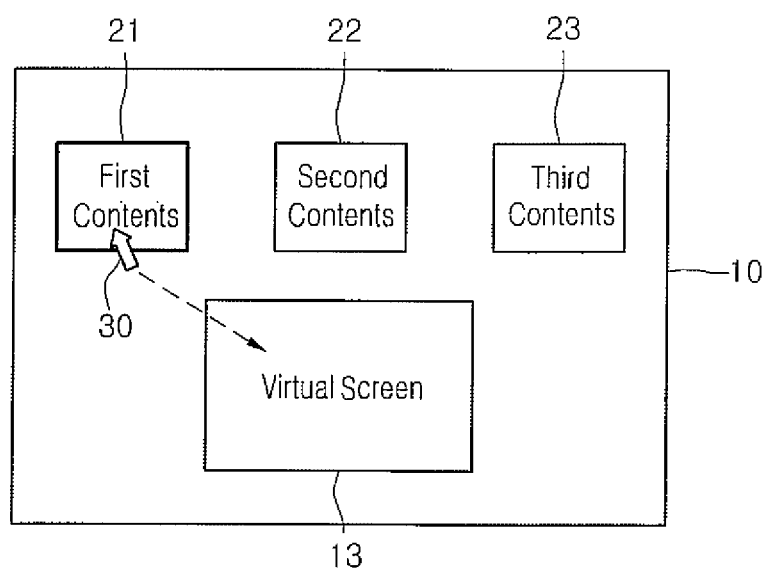
FIGS. 30 to 34 are diagrams illustrating a method for displaying a plurality of contents on a screen according to another embodiment.

FIGS. 30 to 34 are diagrams illustrating a method for displaying a plurality of contents on a screen according to another embodiment. Referring to FIG. 30, a virtual screen region 13 and information 21, 22 and 23 corresponding, respectively, to contents may be displayed on a screen 10. The user may drag the information corresponding to the desired contents and drop the same in the virtual screen region 13, so that the corresponding contents may be displayed on the screen 10.

Figure 31:
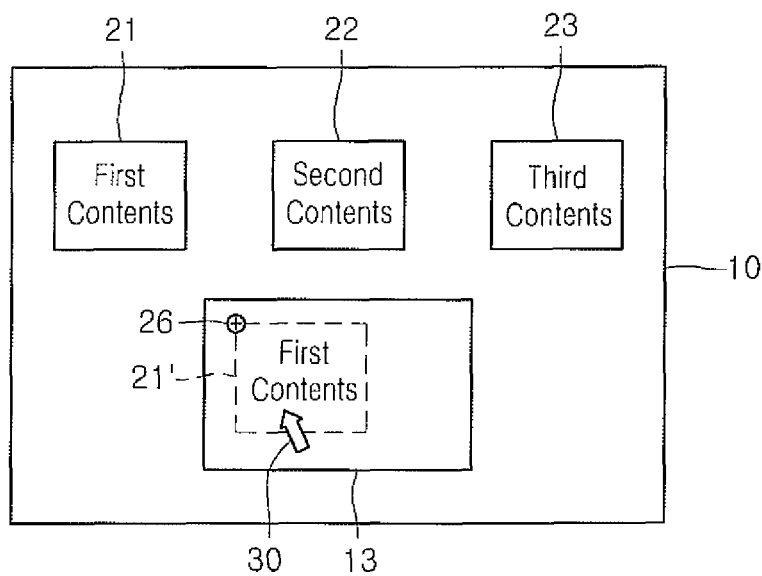
Figure 32:
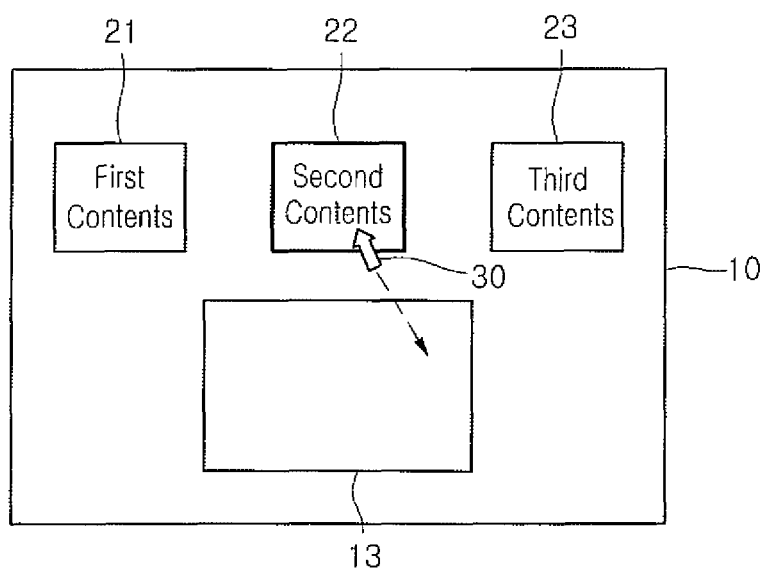
Figure 33:
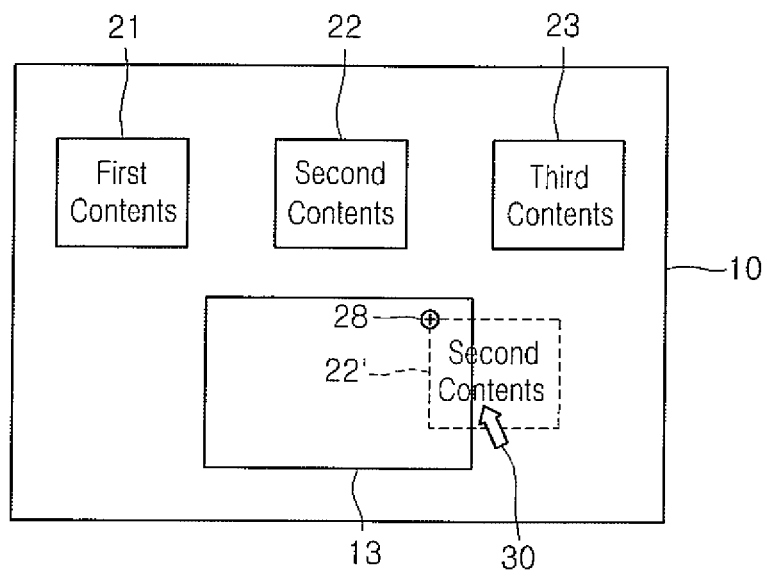

The virtual screen region 13 may correspond to the screen 10 displaying the contents, so that the contents may be displayed at a location corresponding to the drop location of the contents information in the virtual screen region 13. The user may drag and drop the first contents information 21 at a left side of the virtual screen region 13, as illustrated in FIGS. 30 and 31, and may drag and drop the second contents information 22 at a right side of the virtual screen region 13, as illustrated in FIGS. 32 and 33.

Figure 34:
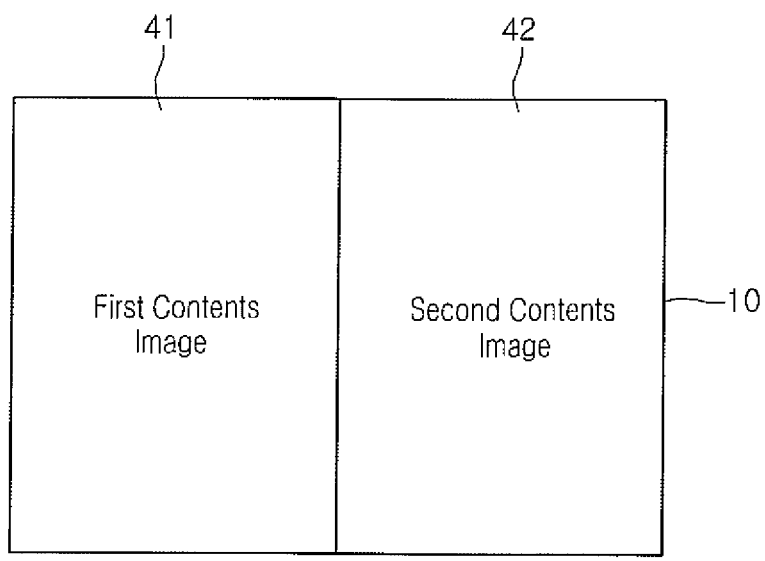

In response to the above described drag and drop operation, the contents playing device may display the first contents image 41 at a left side on the screen 10 and display the second contents image 42 at a right side on the screen 10, as illustrated in FIG. 34. More specifically, as illustrated in FIGS. 30 to 33, the user may drag and drop the first and second contents information 21 and 22 at desired locations of the virtual screen region 13 and press a contents play button to display the first and second contents images 41 and 42 at the desired locations on the screen 10.

While specific contents, for example, an image of a current broadcast channel may be displayed in a virtual screen region 13 on the screen 10, when the user drags and drops information of other contents in the virtual screen region 13 displaying the specific contents, the two contents may be displayed on the screen 10, for example, simultaneously. For example, while the second contents image 42 are displayed in the virtual screen region 13, when the user drags and drops the first contents information 21 in the virtual screen region 13 displaying the second contents image 42, the first and second contents images 41 and 42 may be displayed on the screen 10, for example, simultaneously, as illustrated in FIG. 7.

Although embodiments of a contents playing method have been described above with reference to FIGS. 3 to 34, embodiments are not limited thereto. That is, according to embodiments, a number, location, and size of the contents information displayed on the screen 10 may vary and a shape of the pointer 30 moving according to movement of the input device may also vary.

The pointer 30 may not be displayed on the screen 10. For example, the pointer 30 may be unnecessary if the user touches the screen 10 with his finger to perform the above drag and drop operation.

Further, at least one of the contents played by the contents playing methods according to the embodiments may include images of received broadcast channels.

Figure 35:
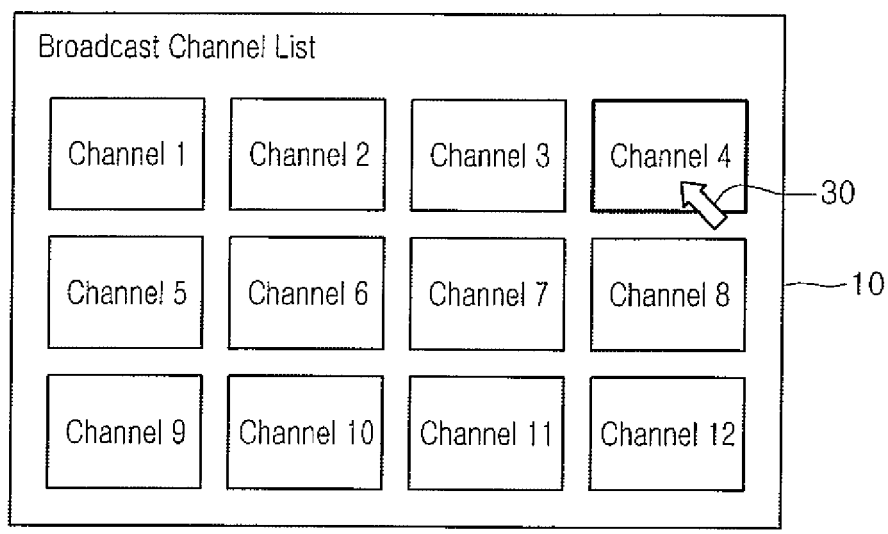
FIG. 35 is a diagram illustrating a method for displaying information on a plurality of broadcast channels according to an embodiment.

FIG. 35 is a diagram illustrating a method for displaying information on a plurality of broadcast channels according to an embodiment. Referring to FIG. 35, information corresponding to receivable broadcast channels, that is, first to twelfth channels may be displayed on a screen 10.

The displayed broadcast channel information may include a name of a broadcasting station of the channel, a channel number, and a content and title of contents, which may be broadcast in or on the channel currently or at a specific time slot, in the shape of for example, characters or images. According to one embodiment, the information on the broadcast channels displayed on the screen 10 may be provided by a channel browser including images, for example, thumbnail images and movie clips, corresponding to videos of the respective broadcast channels. The user may select one of the information on the broadcast channels displayed on the screen 10, to play the contents of a desired channel. For example, as illustrated in FIG. 35, the user may use the input device to move and position the pointer 30 at the information corresponding to a desired channel to select the desired channel.

Figure 36:
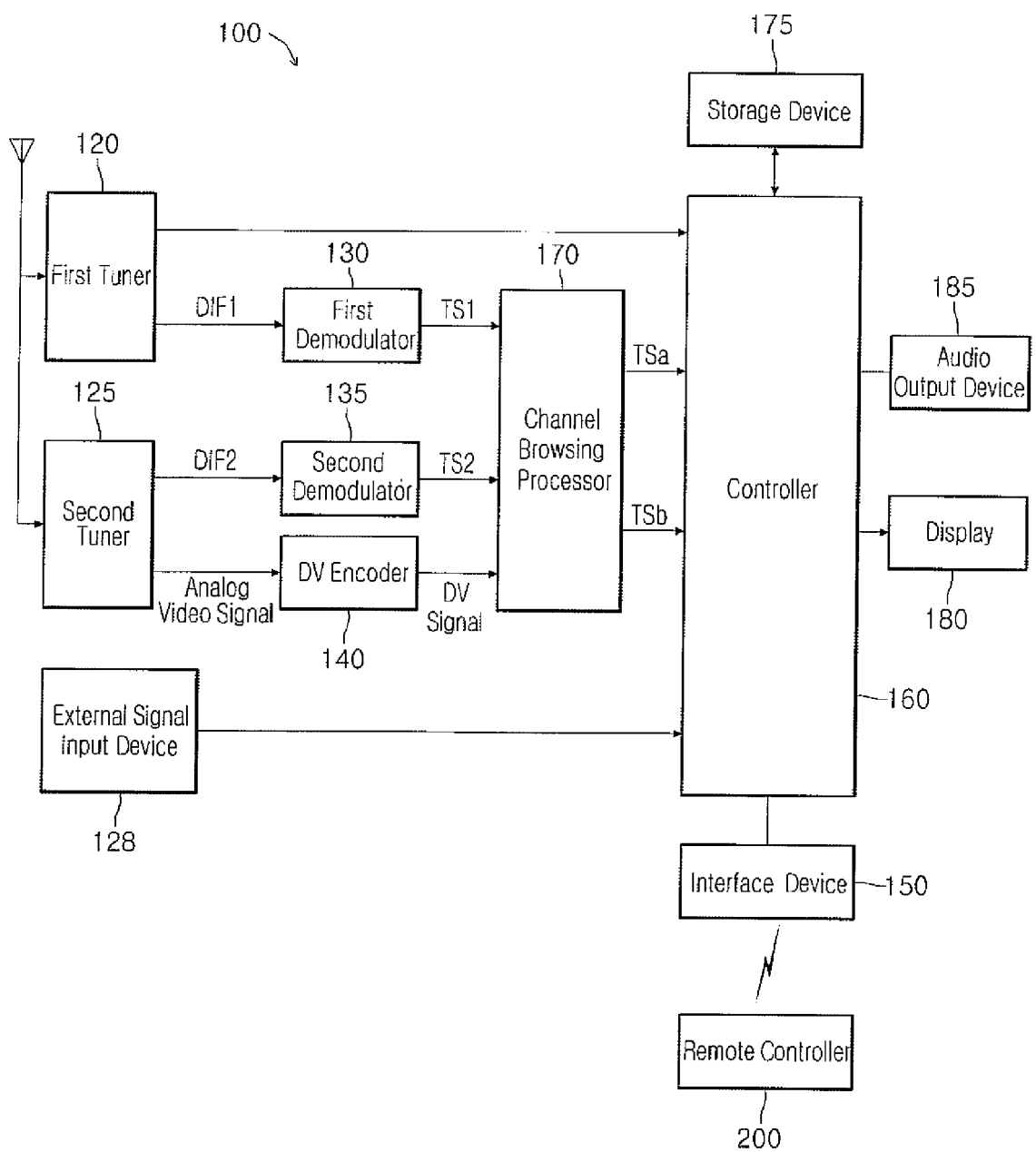
FIG. 36 is a block diagram of a display device according to an embodiment.

FIG. 36 is a block diagram of a display device according to an embodiment. FIG. 36 illustrates a contents playing device that may perform a contents playing method according to an embodiment. Referring to FIG. 36, a display device 100 may include a first tuner 120, a second tuner 125, an external signal input device 128, a first demodulator 130, a second demodulator 135, an analog-to-digital (AD) converter or DV encoder 140, an interface device 150, a controller 160, a channel browsing processor 170, a storage device 175, a display 180, and an audio output device 185.

The first tuner 120 may select a radio frequency (RF) broadcast signal corresponding to a channel selected by a user, among RF broadcast signals received through an antenna, and convert the selected RF broadcast signal into an intermediate frequency (IF) signal or a baseband video/audio signal. For example, if the selected RF broadcast signal is a digital broadcast signal, it may be converted into a digital IF signal DIF1; and if the selected RF broadcast signal is an analog broadcast signal, it may be converted into an analog baseband video/audio signal (CVBS1/SIF). That is, the first tuner 120 may be a hybrid tuner that processes both a digital broadcast signal and an analog broadcast signal. The analog baseband video/audio signal (CVBS1/SIF) output from the first tuner 120 may also be input directly to the controller 160. The first tuner 120 may also receive an ATSC (Advanced Television Systems Committee) single-carrier RF broadcast signal or a DVB (Digital Video Broadcasting) multi-carrier broadcast signal.

Like the first tuner 120, the second tuner 125 may select an RF broadcast signal corresponding to a channel selected by the user, among the RF broadcast signals received through the antenna, and convert the selected RF broadcast signal into an IF signal or a baseband video/audio signal. Further, the second tuner 125 may sequentially or periodically select RF broadcast signals corresponding to all of the broadcast channels prestored through a channel memory function, among the RF broadcast signals received through the antenna, and convert the selected RF broadcast signals into IF signals or baseband video/audio signals. In one embodiment, because videos of other prestored channels may also be displayed on at least a portion of a screen in a thumbnail format, the RF broadcast signals of all of the prestored channels may be sequentially or periodically received. For example, the first tuner 120 may convert a main RF broadcast signal, selected by the user, into an IF signal or a baseband video/audio signal, and the second tuner may sequentially or periodically select all of the RF broadcast signals (sub RF broadcast signals) except the main RF broadcast signal and convert the selected signals into IF signals or baseband video/audio signals.

The first demodulator 130 may demodulate the digital IF signal DIF1 received from the first tuner 120. For example, if the digital IF signal DIF1 output from the first tuner 120 is an ATSC-based signal, the first demodulator 120 may perform an 8-VSB (8-Vestigal Side Band) demodulation operation. The first demodulator 130 may also perform a channel decoding operation.

The first demodulator 130 may include a trellis decoder, a deinterleaver, and a Reed-Solomon decoder to perform a trellis decoding operation, a deinterleaving operation, and a Reed-Solomon decoding operation, respectively. For example, if the digital IF signal DIF1 output from the first tuner 120 is a DVB-based signal, the first demodulator 130 may perform a COFDMA (Coded Orthogonal Frequency Division Multiple Access) demodulation operation. The first demodulator 130 may also perform a channel decoding operation. The first demodulator 130 may include a convolutional decoder, a deinterleaver, and a Reed-Solomon decoder to perform a convolutional decoding operation, a deinterleaving operation, and a Reed-Solomon decoding operation, respectively.

The external signal input device 128 may perform a signal input operation with external devices. The external signal input device 128 may include an A/V input/output device and a wireless communication device.

The external signal input device 128 may be connected to external devices, for example, DVDs (Digital Versatile Disks), Blu-rays, game devices, camcorders, computers, and notebook computers, to transfer external input video signals, external input audio signals, and external input data signals to the controller 160 of the display device 100. Also, the external signal input device 128 may output video, audio, and data signals processed by the controller 160 to other external devices. For input/output of video/audio signals with external devices, the A/V input/output device may include an Ethernet terminal, a USB terminal, a CVBS (Composite Video Banking Sync) terminal, a component terminal, an S-video terminal (analog), a DVI (Digital Visual Interface) terminal, an HDMI (High Definition Multimedia Interface) terminal, an RGB terminal, a D-SUB terminal, an IEEE 1394 terminal, an SPDIF terminal, and a Liquid HD terminal.

Although not illustrated in the drawings, various input signals input through the external signal input device 128 may be input to the channel browsing processor 170 to perform a thumbnail image extracting operation. For example, analog signals input through the CVBS terminal and the S-video terminal may be converted into digital signals prior to being input to the channel browsing processor 170. Digital signals input through the other input terminals may be input directly to the channel browsing processor 170 without analog/digital conversion. The digital signal output from the external signal input device 128 may be a stream signal, such as a MPEG-2 transport stream (TS) generated by multiplexing a Dolby AC-3 audio signal and an MPEG-2 video signal.

The wireless communication device may perform wireless Internet access. For example, WLAN (Wireless LAN) (Wi-Fi), Wibro (Wireless broadband), Wimax (World Interoperability for Microwave Access), or HSDPA (High Speed Downlink Packet Access) may be used for the wireless Internet access.

Also, the wireless communication device may perform local wireless communication with other electronic devices. For example, Bluetooth, RFID (Radio Frequency Identification), IrDA (infrared Data Association), UWB (Ultra Wideband), or ZigBee may be used for the local wireless communication.

The external signal input device 128 may also he connected through at least one of the above various terminals to various settop boxes to perform input/output operation with the settop boxes. For example, if the settop box is an IP (Internet Protocol) TV settop box, the external signal input device 128 may transfer video, audio, and data signals processed by the IPTV settop box to the controller 160 and may transfer signals processed by the controller 160 to the IPTV settop box.

The video, audio, and data signals processed by the IPTV settop box may also be processed by the controller 160 through the channel browsing processor 170. Depending on the types of transmission networks, examples of the above IPTV may include ADSL-TV, VDSL-TV, and FTTH-TV, and may include TV over DSL, Video over DSL, TV over IP (TVIP), and Broadband TV (BTV). Examples of the above IPTV may also include Internet TV and full browsing TV.

The first demodulator 130 may perform a demodulation and channel decoding operation and output a stream signal TS1. The stream signal TS1 may be a signal generated by multiplexing a video signal, an audio signal, and a data signal. For example, the stream signal TS1 may be a MPEG-2 transport stream (TS) generated by multiplexing a MPEG-2 video signal and a Dolby AC-3 audio signal. More specifically, the MPEG-2 TS may include a 4-byte header and a 184-byte payload.

The stream signal TS1 may be input to the controller 160 to be demultiplexed and signal-processed. In one embodiment, prior to being input to the controller 160, the stream signal TS1 may be input to the channel browsing processor 170 to be processed for a channel browsing operation. The channel browsing operation will be described later in more detail.

The first demodulator 130 may be provided as separate units according to an ATSC mode and a DVB mode. That is, the first demodulator 130 may be provided as an ATSC demodulator and a DVB demodulator.

The second demodulator 135 may demodulate the digital IF signal DIF2 received from the second tuner 125, to output a stream signal TS2. The second demodulator 135 may operate in the same manner as the first demodulator 130, and thus, a detailed description thereof has been omitted.

If the signal output from the second tuner 125 is an analog baseband video signal (CVBS2), it may need to be converted into a digital signal by the AD converter 140. The AD converter 140 may convert an input analog signal into a digital signal. If the input signal is a video signal, it may be converted into a digital video signal DV through sampling and quantization. The digital signal may be a non-encoded signal. The digital video signal DV may be input to and processed by the channel browsing processor 170.

The interface device 150 may transfer an input signal from a user to the controller 160 or may transfer a signal from the controller 160 to the user. For example, through various communication schemes, such as a RF communication scheme and an IR communication scheme, the interface device 150 may receive user input signals, such as power on and off signals, a channel selection signal, and a screen setting signal from the remote controller 200, or may transmit a signal from the controller 160 to the remote controller 200.

The controller 160 may demultiplex an input stream and process the demultiplexed signals to generate output signals for video/audio output. The controller 160 may control an overall operation of the display device 100.

Although not illustrated in the drawings, the controller 160 may include a demultiplexer, a video processor, an audio processor, and a user input signal processor. The controller 160 may demultiplex an input stream signal, for example, a MPEG-2 TS signal, into a video signal, an audio signal, and a data signal. The controller 160 may perform a video process for the demultiplexed video signal. For example, if the demultiplexed video signal is an encoded video signal, it may be decoded. For example, if the demultiplexed video signal is a MPEG-2 encoded video signal, it may be decoded by a MPEG-2 decoder. Also, if the demultiplexed video signal is a DMB-based or DVB-H-based H.264 encoded video signal, it may be decoded by an H.264 decoder.

The controller 160 may control a brightness, tint, and color of the video signal. The video signal processed by the controller 160 may be input to and displayed by the display 180. Also, it may be input to an external output terminal connected to an external output device.

Further, the controller 160 may perform an audio process for the demultiplexed audio signal. For example, if the demultiplexed audio signal is an encoded audio signal, it may be decoded. For example, if the demultiplexed audio signal is a MPEG-2 encoded audio signal, it may be decoded by a MPEG-2 decoder.

Also, if the demultiplexed audio signal is a DMB-based MPEG-4 BSAC (Bit Sliced Arithmetic Coding) encoded audio signal, it may be decoded by a MPEG-4 decoder. Also, if the demultiplexed audio signal is a DMB-based or DVB-H-based MPEG-2 AAC (Advanced Audio Codec) encoded audio signal, it may be decoded by an AAC decoder.

Additionally, the controller 160 may control a base, treble, and volume of the audio signal. The audio signal processed by the controller 160 may be input to the audio output device 185, for example, a speaker, to be output as sound. Also, it may be input to an external output terminal connected to an external output device.

Also, the controller 160 may perform a data process for the demultiplexed data signal. For example, if the demultiplexed data signal is an encoded data signal, it may be decoded. The encoded data signal may be EPG (Electronic Program Guide) information including broadcast information, such as a start time and an end time of a broadcast program broadcast through each channel.

For example, in the case of an ATSC mode, the EPG information may be TSC-PSIP (ATSC-Program and System Information Protocol) data. In the case of a DVB mode, the EPG information may include DVB-SI (DVB-Service Information) data. The ATSC-PSIP data or the DVB-SI data may be data included in the 4-byte header of the above stream, that is, the MPEG-2 TS.

The controller 160 may perform an OSD (On Screen display) process. More specifically, on the basis of at least one of the video-processed video signal, the data-processed data signal, or the user input signal received from the remote controller 200, the controller 160 may generate signals for displaying various information on a screen of the display 180 in, for example, a graphic or text format. The generated signals may be input to the display 180 together with the video-processed video signal and the data-processed data signal. The signals generated for the graphic or text display may include various data, such as icons, widgets, menu screens, and user interface screens of the display device 100.

The channel browsing processor 170 may perform a browsing process for at least one of various input video signals input through the external signal input device 128 and broadcast signals corresponding to received channels. More specifically, the channel browsing processor 170 may receive the demodulated and channel-decoded stream TS1/TS2 from the demodulator 130/135, the stream signal from the external signal input device 128, or the digital signal from the AD converter 140, demultiplex the stream signal TS1/TS2, extract some of the demultiplexed video signals, and perform a multiplexing operation on the basis of video signals including the extracted video signals to output a new stream signal TSa. For example, the stream signal TSa/TSb may be a MPEG-2 TS signal.

Also, the channel browsing processor 170 may output a main stream signal TSb corresponding to a main video signal displayed on a main screen region, among video signals displayed on the display 180, without performing a separate process, and may perform a channel browsing process on a sub stream signal TSa corresponding to a sub video signal displayed on a sub screen region, among the video signals displayed on the display 180, as described above.

In one embodiment, the channel browsing processor 170 may extract some of the broadcast signal videos of channels and re-encode the same in a stream format, thereby making it possible to display at least some of the broadcast signal videos of the channels on the screen in a thumbnail format when displaying a channel list on the display 180. Accordingly, the user may detect or recognize the contents broadcast in or on other channels.

The channel browsing processor 170 may extract some of various external input videos input through the external signal input device 128 and re-encode the same in a stream format, thereby making it possible to display at least some of external input videos from external input devices on the screen in a thumbnail format when displaying an external input list on the display 180. Accordingly, the user may detect or recognize the contents input from the external input devices.

The channel browsing processor 170 may extract some of the broadcast channel signal videos and the external input videos and re-encode the same in a stream format, thereby making it possible to display at least some of the broadcast channel signal videos and the external input videos from the external input devices on the screen in a thumbnail format when displaying the channel list and the external input list on the display 180. Accordingly, the user may detect or recognize the contents received through the channels and the external input devices.

The storage device 175 may store a program for control and process of each signal in the controller 160, and may store signal-processed video signals, audio signals, and data signals. Also, the storage device 175 may temporarily store video, audio, and data signals received from the external signal input device 128.

Further, the storage device 175 may store a corresponding broadcast channel through a channel memory function. The storage device 175 may include a storage medium of at least one of a flash memory type, a hard disk type, a multimedia card micro type, a card type memory, for example, SD or XD memory, a RAM, or a ROM, for example, EEPROM.

Although it has been illustrated that the storage device 175 may be provided separately from the controller 160, embodiments are not limited thereto. That is, the storage device 175 may also be provided in the controller 160.

The display device 100 may play files, for example, video files, image files, music files, and text files, stored in the storage device 175, to provide the same to the user. The display 180 may generate a driving signal by converting a video signal, a data signal, and an OSD signal, processed by the controller 160, or a video signal and a data signal, received from the external signal input device 128, into R/G/B signals.

The display 180 may be implemented in various types, such as a PDP, a LCD, an OLED, a flexible display, and a three-dimensional (3D) display. Also, the display 180 may be used as not only an output device, but also an input device by being configured with a touchscreen.

The audio output device 185 may receive audio-processed signals, for example, a stereo signal, a 3.1 channel signal, and a 5.1 channel signal, from the controller 160 to output a sound. The audio output device 185 may be implemented as various types of speakers.

The remote controller 200 may transmit a user input to the interface device 150. The remote controller 200 may use, for example, Bluetooth communication, RF communication, IR communication, UWB communication, or ZigBee communication. Also, the remote controller 200 may receive video signals, audio signals, and data signals from the interface device 150 and output the same.

According to one embodiment, the remote controller 200 may be an input device that performs a user input, for example, a drag and drop operation, as described with reference to FIGS. 1 to 34. That is, the user may use the remote controller 200 to move pointer 30 displayed on the screen.

Although FIG. 36 illustrates that the display device 100 includes two tuners 120 and 125, embodiments are not limited thereto. That is, the display device 100 may also include one, or three or more tuners.

The above described display device 100 may be a stationary digital broadcast receiver capable of receiving at least one of an ATSC (8-VSB) digital broadcast, a DVB-T (COFDM) digital broadcast, or an ISDB-T (BST-OFDM) digital broadcast, or a mobile digital broadcast receiver capable of receiving at least one of a terrestrial DMB digital broadcast, a satellite DMB digital broadcast, an ADSC-M/H digital broadcast, a DVB-H (COFDM) digital broadcast, or a MediaFLO (Media Forward Link Only) digital broadcast. The display device 100 may also be a cable, satellite, or IPTV digital broadcast receiver.

Figure 37:
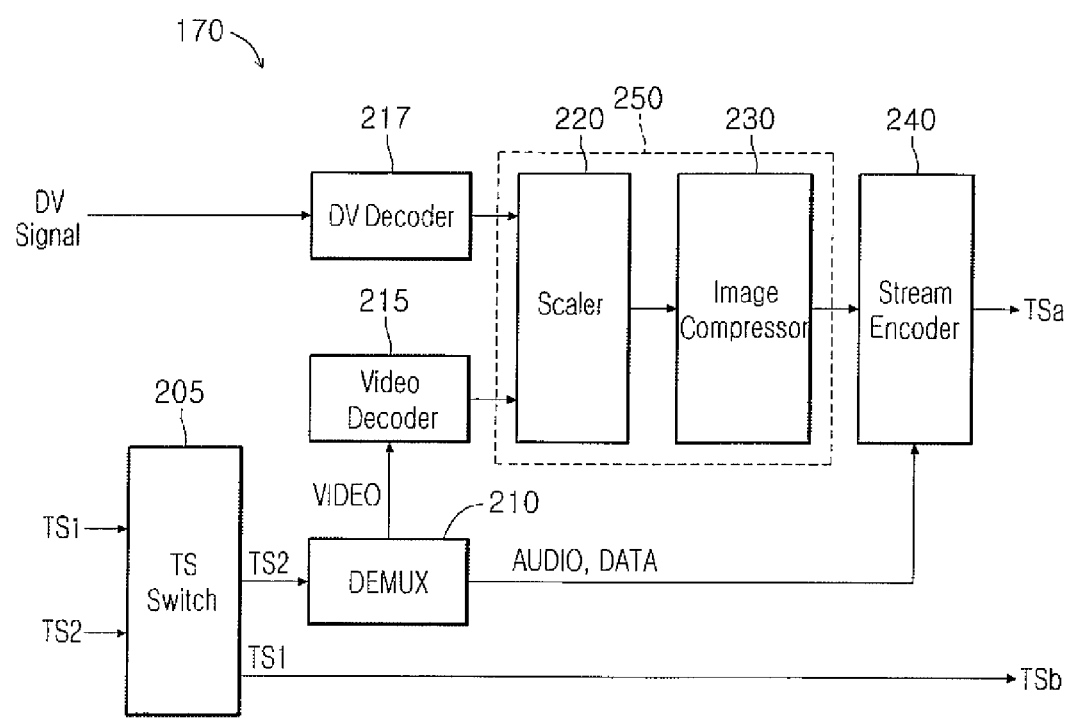
FIG. 37 is a block diagram of a channel browsing processor of FIG. 36.

FIG. 37 is a block diagram of a channel browsing processor of FIG. 36. Referring to FIG. 37, the channel browsing processor 170 may include a TS switch 205, a demultiplexer (DEMUX) 210, a video decoder 215, a DV decoder 217, a thumbnail generator 250, and a stream encoder 240.

The TS switch 205 may select one of the input streams TS1 and TS2 to output the same as a TS-type main stream TSb without separate conversion into a main stream, and transfer the other one to the demultiplexer 210 to output the same as a TS-type sub stream TSa. A main stream TS1 corresponds to a main video signal and a main broadcast signal. The main broadcast signal may be displayed on most of the display 180. A sub stream TS2 transferred to the demultiplexer 210 may correspond to a sub video signal except the main channel, and a thumbnail extracted from the sub stream TS2 may be displayed on a partial region of the display 180. The TS switch 205 may be used to select the TS2 as the main stream and select the TS1 as the sub stream. That is, one of the streams input to the TS switch 205 may be selected as the main stream and the other one may be selected as the sub stream.

This operation may be performed in a shortcut view mode for a 'broadcast channel list' that displays a channel list only on a partial region of the display 180, not on the entire region of the display 180. A thumbnail may be extracted from the sub stream input to the demultiplexer 210, and may be displayed in a shortcut view. In addition, the shortcut view mode may also be performed to display an external input list on the display 180. Also, the shortcut view mode may also be performed to display both of a channel list and an external input list on the display 180.

The demultiplexer 210 may demultiplex a received stream signal TS1/TS2 into a video signal, an audio signal, and a data signal. The video signal may be transferred to the video decoder 215, and the audio signal and the data signal may be transferred to the stream encoder 240.

The video decoder 215 may extract a picture from the video signal and decode the same. The extracted picture may be an I picture of the video signal or pictures corresponding to some sections of the video signal. The decoding operation may be performed by a MPEG-2, MPEG-4, or H.264 decoder. The DV decoder 217 may receive the digital signal DV from the DV encoder 140 to extract a picture or pictures of some sections.

The thumbnail generator 250 may generate a thumbnail by scaling and compress the pictures received from the video decoder 215 or the DV decoder 217. A scaler 220 of the thumbnail generator 250 may scale the video signal, received from the video decoder 215 or the DV decoder 217, to control the data amount. For example, a size or resolution of the video signal may be converted. This size conversion may be performed to display the video signal in a suitable size if it is displayed on the display 180 in a thumbnail format.

The scaler 220 may convert the input pictures into video signals of different sizes according to a shortcut view of the broadcast channel list and a full view of the broadcast channel list. For example, a size of a video displayed in a thumbnail format in a full view of a video channel list may be greater than a size of a video displayed in a shortcut view of the video channel list.

The shortcut view mode and the full view mode may also be performed if the external input list, as well as the channel list, is displayed on the display 180. Also, the shortcut view mode and the full view mode may also be performed if both the external input list and the channel list are simultaneously displayed on the display 180.

An image compressor 230 of the thumbnail generator 250 may encode and compress the video signal converted by the scaler 220. For example, the video converted by the scaler 220 may be encoded by JPEG or MPEG-2. The image or the video encoded by the image compressor 230 may be displayed on the display 180 in a thumbnail format.

The stream encoder 240 may packetize and multiplex the video, encoded by the image compressor 230, and the audio and data signals, received from the demultiplexer 210, in a transport stream (TS) format. The packetized transport stream may be an MPEG-2 TS format or may have the same format as the transport stream TS1/TS2 received from the channel browsing processor 170.

According to one embodiment, the channel browsing processor 170 may be used to extract and re-encode at least some of the external input videos and the broadcast signal videos of the channels, so that at least some of the channel broadcast signal videos and the external input videos from the external input devices may be displayed on the screen in a thumbnail format in 'broadcast list view' or 'external input list view'. Accordingly, the user may detect or recognize contents broadcast in other channels or the contents received from the external input devices.

The channel browsing processor 170 of FIG. 37 may output two output streams TSa and TS. Further, the channel browsing processor 170 may use an SPI (System Packet Interface) if a chip of the controller 160 of FIG. 36 has a structure capable of receiving only one input.

Figure 38:
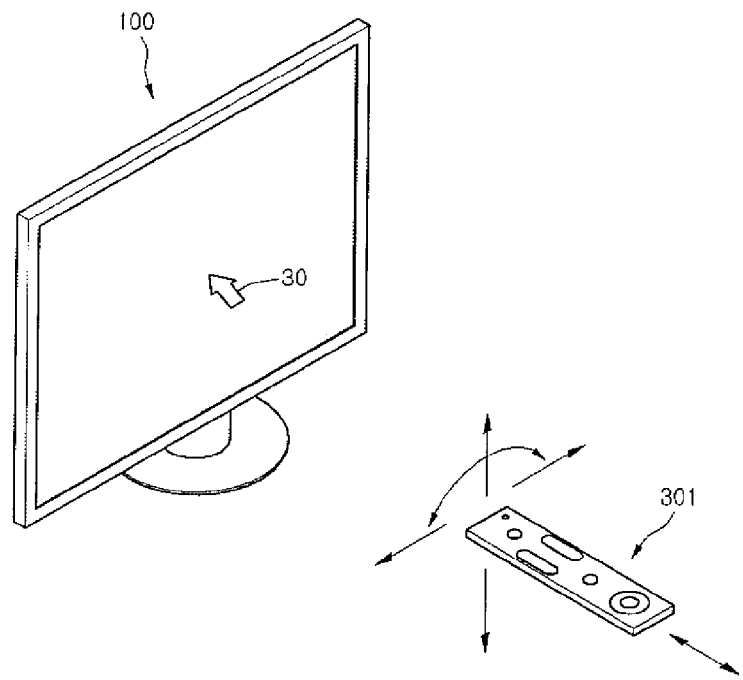
FIGS. 38 and 39 are diagrams illustrating an operation of a remote controller of FIG. 36.
Figure 39:
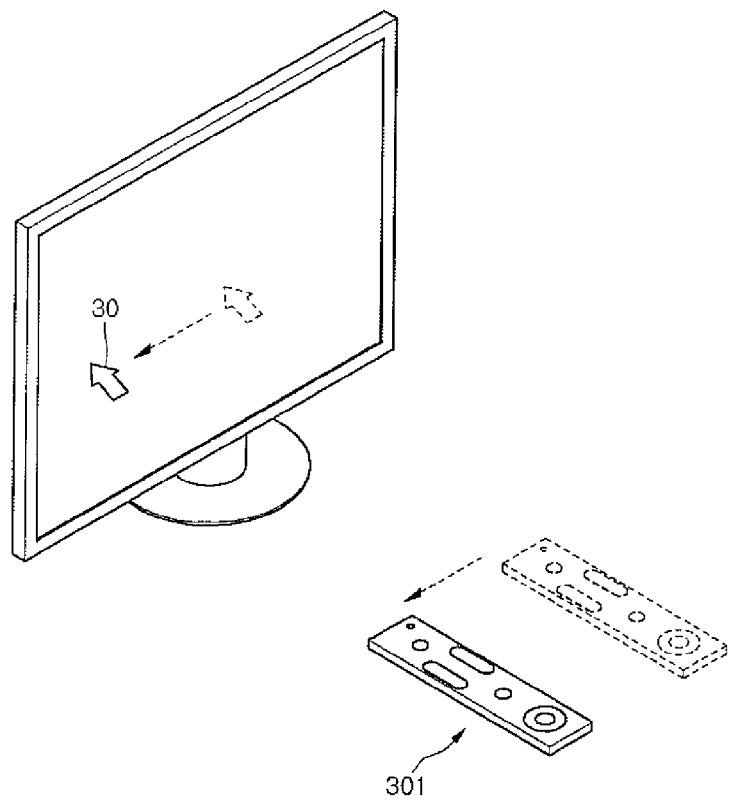

FIGS. 38 and 39 are diagrams illustrating an operation of the remote controller 200 of FIG. 36. According to this embodiment, the remote controller 200 may be a spatial remote controller that detects a motion of the user and provides a signal corresponding to the detected motion to the display device 100. The user may use the spatial remote controller to perform an input operation, for example, a drag and drop operation, described with reference to FIGS. 1 to 34.

Referring to FIG. 38, a spatial remoter controller 301 is a user input device capable of inputting commands to the display device 100, which may communicate signals with the display device 100 according to the RF communication standard. The display device 100 may display the pointer 30, which may move in correspondence with a motion of the spatial remote controller 301.

The user may rotate or move the spatial remote controller 301 in up, down, left, right, front, and rear directions. The pointer 30 displayed on the display device 100 may move in correspondence with the motion of the spatial remote controller 301. As illustrated in FIG. 39, if the user moves the spatial remote controller 301 to the left, the pointer 30 displayed on the display device 100 may move to the left in correspondence with the motion of the spatial remote controller 301.

In one embodiment, the spatial remote controller 301 may include a motion sensor, and information about the motion of the spatial remote controller 301 sensed by the motion sensor may be transmitted to the display device 100. The display device 100 may determine the motion of the spatial remote controller 301 on the basis of the information about the motion of the spatial remote controller 301, and may calculate the corresponding coordinates of the pointer 30.

A predetermined command corresponding to the motion of the spatial remote controller 301 may be input to the display device 100. That is, if the spatial remote controller 301 moves in the front and rear directions, a size of an image displayed on the display device 100 may increase or decrease; however, embodiments are not limited thereto.

Figure 40:
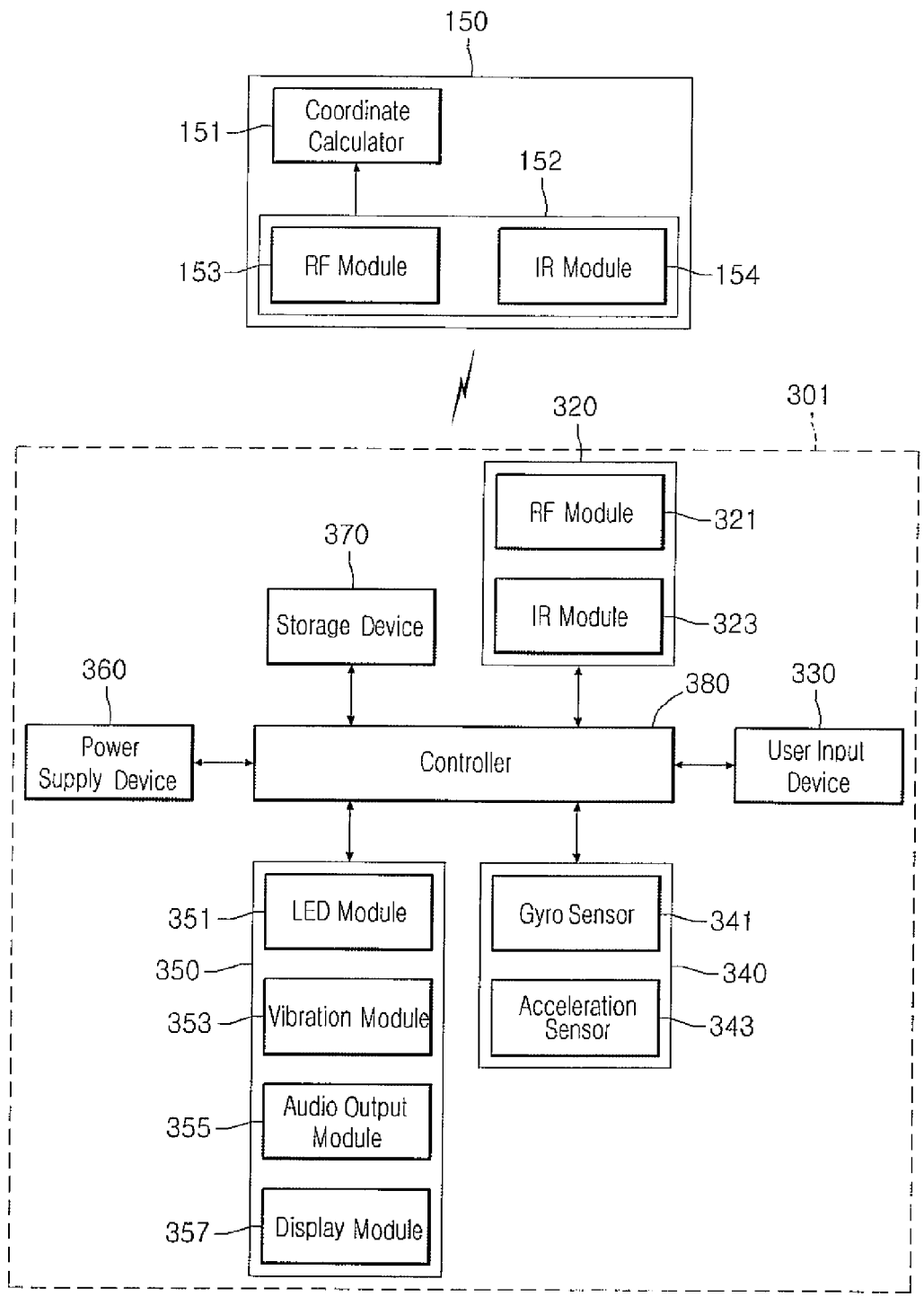
FIG. 40 is a block diagram of a spatial remote controller according to an embodiment.

FIG. 40 is a block diagram of a spatial remote controller according to an embodiment. FIG. 40 illustrates a spatial remote controller 301 that communicates signals with the interface device 150 illustrated in FIG. 36. Referring to FIG. 40, the spatial remote controller 301 may include a wireless communication device 320, a user input device 330, a sensor 340, an output device 350, a power supply device 360, a storage device 370, and a controller 380.

The wireless communication device 320 may communicate signals with the display device 100. In this embodiment, the spatial remote controller 301 may include a RF module 321 that communicates signals with the interface device 150 of the display device 100 according to the RF communication standard. Also, the spatial remote controller 301 may further include an IR module 323 that communicates signals with the interface device 150 of the display device 100 according to the IR communication standard.

The spatial remote controller 301 may transmit a signal corresponding to the motion of the spatial remote controller 301 to the display device 100 through the RF module 321. Further, the spatial remote controller 301 may receive a signal from the display device 100 through the RF module 321. When necessary, the spatial remote controller 310 may transmit a power on or off command, a channel change command, and a volume change command to the display device 100 through the IR module 323.

The user input device 330 may include, for example, keypads or buttons. The user may control the user input device 330 to input commands related to the display device 100 into the spatial remote controller 301.

If the user input device 330 includes a hard key button, the user may push the hard key button to input a command related to the display device 100 into the spatial remote controller 301. If the user input device 330 includes a touchscreen, the user may touch a soft key of the touchscreen to input a command related to the display device 100 into the spatial remote controller 301. Also, the user input device 330 may include various input means, such as a scroll key and a jog key; however, embodiments are not limited thereto.

The sensor 340 may include a gyro sensor 341 and/or an acceleration sensor 343. The gyro sensor 341 may sense information about the motion of the spatial remote controller 301. For example, the gyro sensor 341 may sense information about the motion of the spatial remote controller 301 with respect to x, y, and z axes. The acceleration sensor 341 may sense information of a moving speed of the spatial remote controller 301.

The output device 350 may output video or audio signals corresponding to the control of the user input device 330 or the transmission signal of the display device 100. The output device 350 may include a LED module 351 turned on or off according to the control of the user input device 330 or the signal about the display device 100 received through the wireless communication device 320, a vibration module 353 that generates vibrations, an audio output module 355 that outputs sounds, and a display module 357 that outputs videos.

The power supply device 360 may supply power to the spatial remote controller 301. The power supply device 360 may stop the power supply to the spatial remote controller 301 if the spatial remote controller 301 does not move for a predetermined period of time, thereby reducing a waste of power. The power supply device 360 may resume the power supply if a predetermined key of the spatial remote controller 301 is pressed.

The storage device 370 may store various application data necessary for the control or operation of the spatial remote controller 301. If the spatial remote controller 301 wirelessly communicates signals with the display device 100 through the RF module 321, the spatial remote controller 301 and the display device 100 may communicate signals with each other through a predetermined frequency band.

The controller 380 of the spatial remote controller 301 may store information about a frequency band, which makes it possible to wirelessly communicate signals with the display device 100 paired with the spatial remote controller 301, in the storage device 370 for later reference. Further, the controller 380 may control details related to the control of the spatial remote controller 301. The controller 380 may transmit a signal corresponding to the control of a predetermined key of the user input device 330, or a signal corresponding to the motion of the spatial remote controller 301 sensed by the sensor 340, to the interface device 310 of the display device 100 through the wireless communication device 320.

The interface device 150 may include a wireless communication device that wirelessly communicates signals with the spatial remote controller 301, and a coordinate calculator that calculates a coordinate of the pointer corresponding to the motion of the spatial remote controller 301.

The wireless communication device 320 may wirelessly communicate signals with the spatial remote controller 301 through the RF module 321. Also, the wireless communication device 152 may receive a signal transmitted by the spatial remote controller 301 through the IR module 323.

The coordinate calculator may calculate the coordinates (x,y) of the pointer 30 to be displayed on the display 180, by correcting an error or a shift on the basis of a signal corresponding to the motion of the spatial remote controller 301 received through the wireless communication device 152.

The transmission signal of the spatial remote controller 301 input through the interface device 150 to the display device 100 may be transmitted to the controller 160 of the display device 100. The controller 160 may determine information about a key control or operation of the spatial remote controller 301 on the basis of the transmission signal of the spatial remote controller 301, and control the display device 100 according to the determination results.

Figure 41:
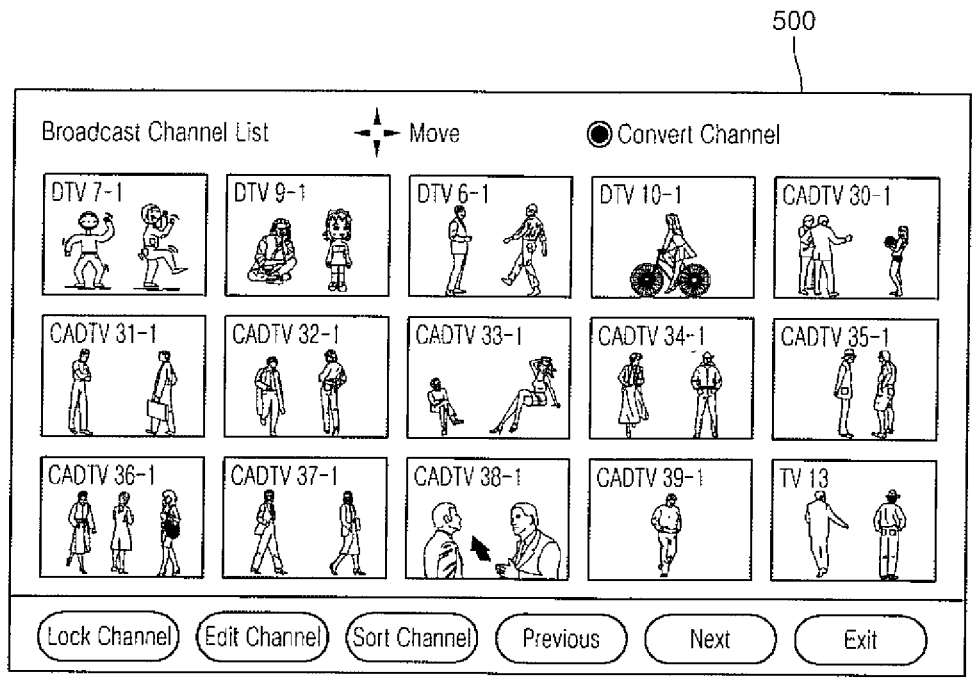
FIG. 41 is a diagram of a channel browser according to an embodiment.

FIG. 41 is a diagram of a channel browser according to an embodiment. Referring to FIG. 41, a channel browser including thumbnail images corresponding to broadcast channels receivable by the display device may be displayed on a screen 500. Because the channel browser includes the thumbnail images corresponding to the broadcast channels, the user may detect or recognize the contents broadcast in or on the broadcast channels.

The channel browser displayed on the display 180 may further include an edit menu. The edit menu may include a 'lock channel' item for performing a lock function to make it impossible to edit a selected thumbnail image; an 'edit channel' item for editing a selected thumbnail image; a 'sort channel' item for sorting thumbnail images for display; a 'previous' item for displaying the previous thumbnail image except the displayed thumbnail image; a 'next' item for displaying the next thumbnail image except the displayed thumbnail image; and an 'exit' item for moving from the 'image channel list' to another menu item. The thumbnail image displayed in the channel browser may be a video or an image, and may be an image of the contents currently received in the corresponding channel or an image of the prestored contents. Further, the thumbnail images may be images processed and output by the channel browsing processor 170.

While the channel browser is displayed, if one of the displayed thumbnail images is selected, a broadcast signal video of the channel corresponding to the selected thumbnail image may be displayed on the screen 500. Also, the thumbnail images displayed in the channel browser may be sorted according to one of a channel number, a predetermined preference channel, a recent viewing channel, or a preset deletion channel.

As illustrated in FIG. 41, a cursor or a pointer may be displayed on the channel browser. If a user input device, such as the spatial remoter controller 301, is used to provide a movement input for the cursor or pointer, the cursor or pointer may move according to the up, down, left, and right moving direction.

Although FIG. 41 illustrates that the channel browser is displayed through or on the entire region of the screen 500, embodiments are not limited thereto. For example, the channel browser including thumbnail images may be displayed in a partial region of the screen 500 while a specific video is displayed on the screen 500. Some of the thumbnail images may be updated periodically or randomly, and the update operation may be performed by the channel browsing processor 170.

Figure 42:
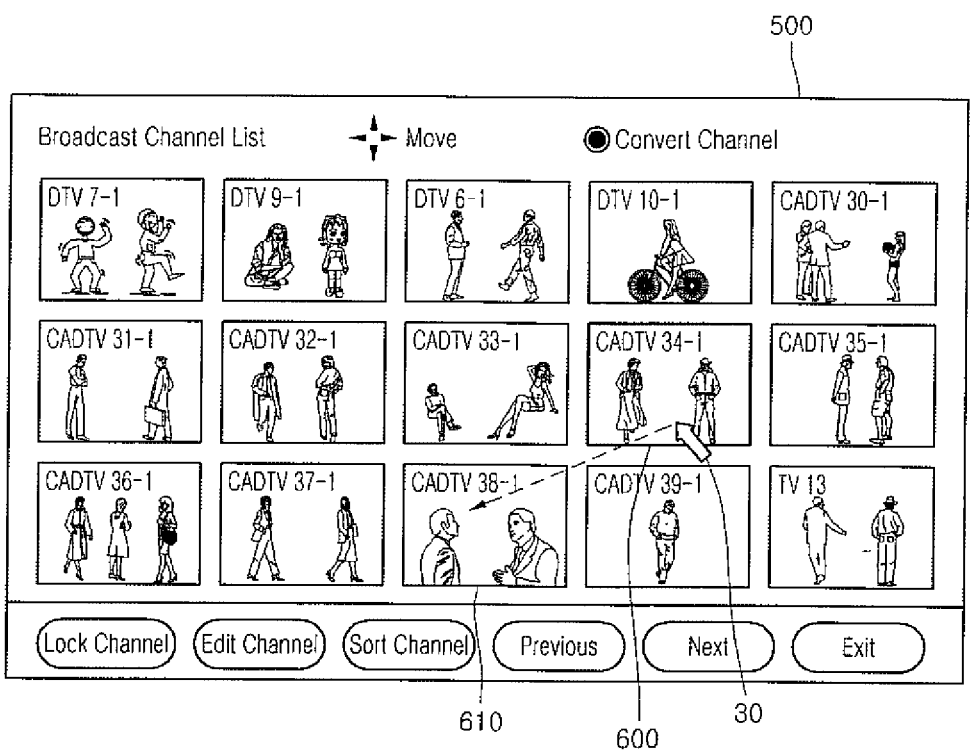
FIGS. 42 to 44 are diagrams illustrating a method for playing a plurality of channels in a channel browser according to an embodiment.
Figure 43:
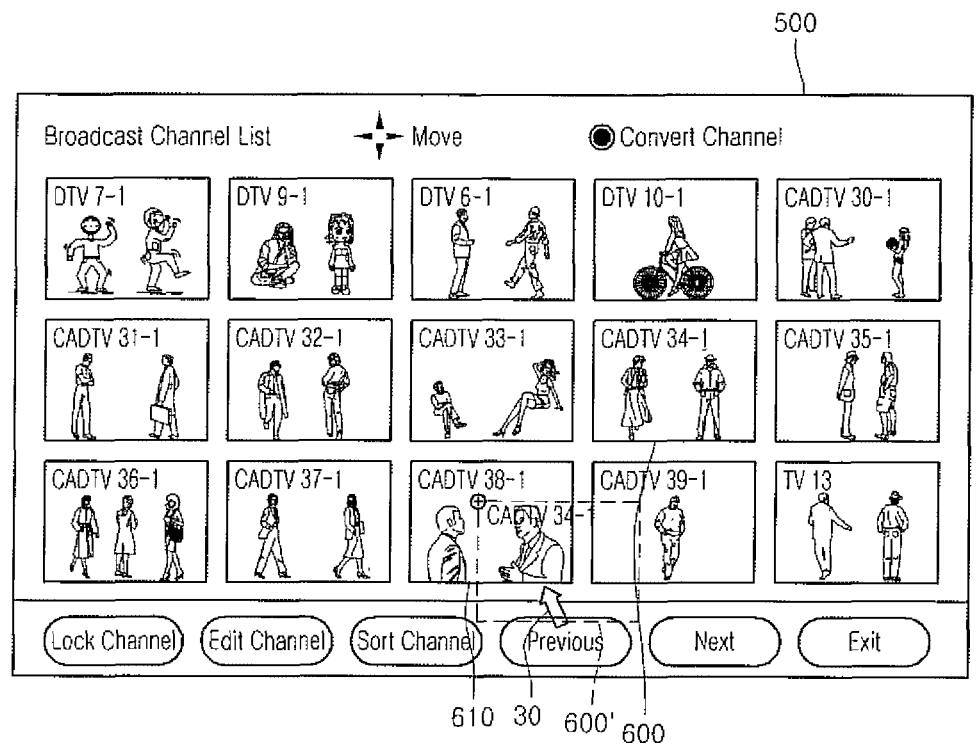
Figure 44:
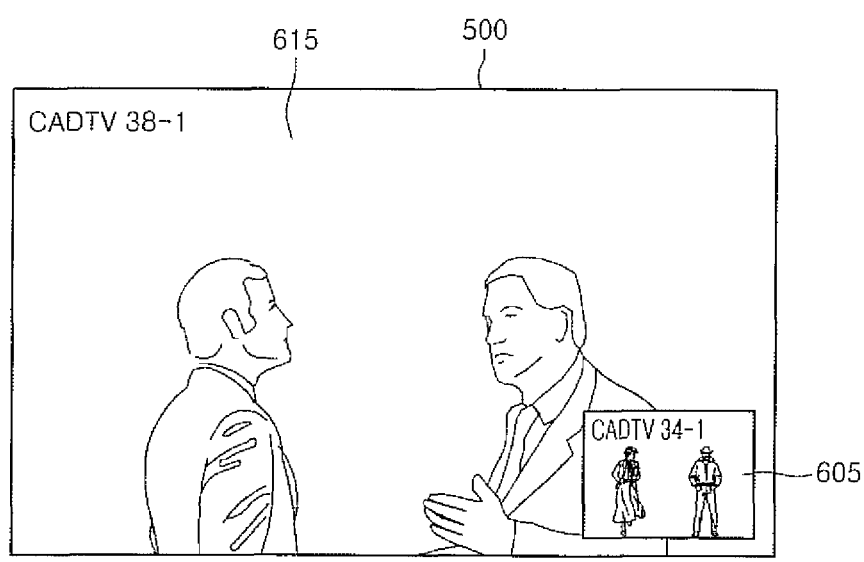

FIGS. 42 to 44 are diagrams illustrating a method for playing a plurality of channels in the channel browser according to an embodiment. FIGS. 42 and 44 illustrate a method for selecting a plurality of channels in the channel browser of FIG. 41 and displaying the selected channels on the screen simultaneously.

Referring to FIG. 42, a user input device, for example, the spatial remote controller 301, may be used to move the pointer 30 displayed on the screen 500, thereby selecting one of the thumbnail images included in the channel browser. The user may use the spatial remote controller 301 to select a thumbnail image corresponding to a desired channel and drag the same in a specific direction (represented by the dotted arrow in FIG. 42).

For example, the user may select a thumbnail image corresponding to a first channel, drag the same in a specific direction, and drop the dragged thumbnail image at a location of a thumbnail image of a second channel that is to be viewed simultaneously with the first channel. In response to the drag and drop operation according to the use of the spatial remote controller 301 by the user, a video of the first channel and a video of the second channel may be simultaneously displayed on the screen 500. More specifically, the user may detect or recognize the thumbnail images displayed in the channel browser, detect or recognize the contents of the respective channels, and accordingly, choose or select to view a 'CADTV 34-1' channel and a 'CADTV 38-1' channel simultaneously. In this case, as illustrated in FIGS. 42 and 43, the user may drag a thumbnail image 600 corresponding to the 'CADTV 34-1' channel and drop the same in the display region of a thumbnail image 610 corresponding to the 'CADTV 38-1' channel. According to the input of the drag and drop operation into the display device, a video 605 of the 'CADTV 34-1' channel and a video 615 of the 'CADTV 38-1' channel may be simultaneously displayed on the screen 500, as illustrated in FIG. 44. As illustrated in FIG. 44, the video 605 of the 'CADTV 34-1' channel corresponding to the dragged thumbnail image 600 may be displayed in the sub screen, and the video 615 of the 'CADTV 38-1' channel corresponding to the thumbnail image 610 of the drop region may be displayed in the main screen.

Besides the above embodiments, the contents playing methods described with reference to FIGS. 8 to 34 may be performed in the channel browser illustrated in FIG. 41.

Figure 45:
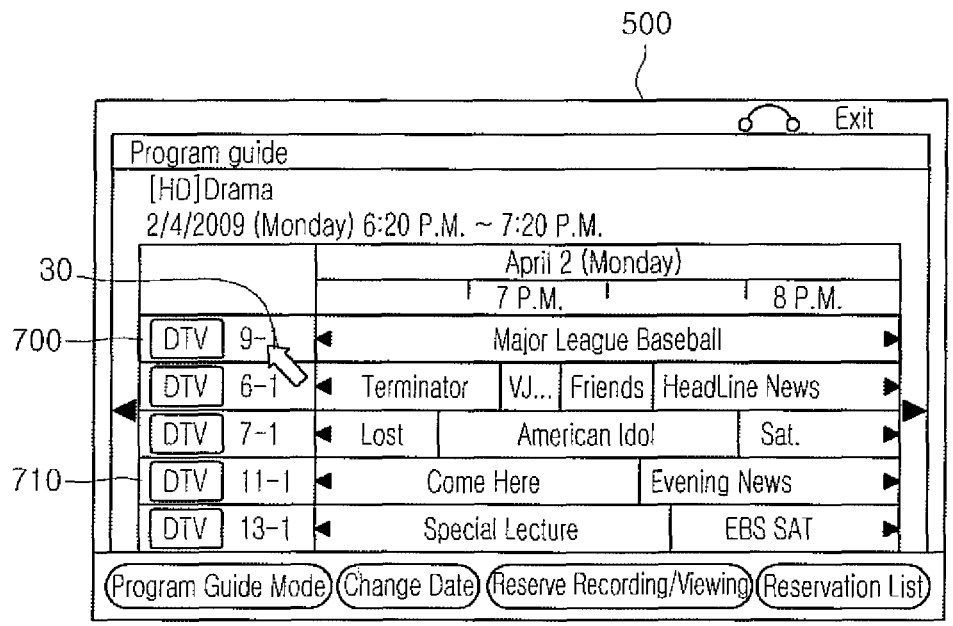
FIGS. 45 to 47 are diagrams illustrating a method for playing a plurality of channels in a program information window according to an embodiment.
Figure 46:
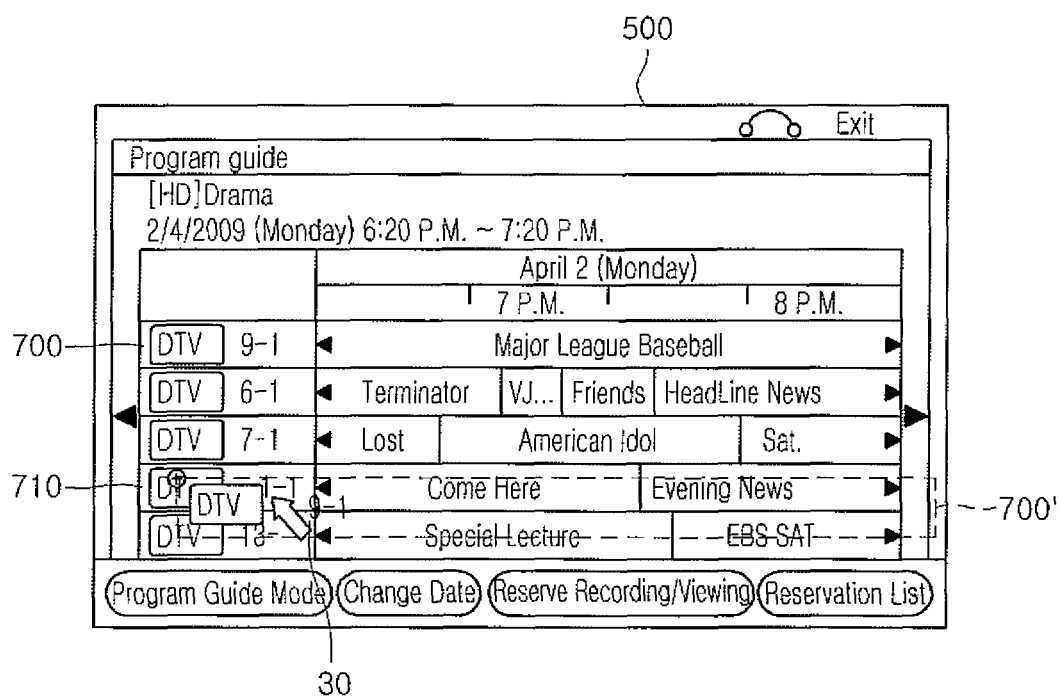
Figure 47:
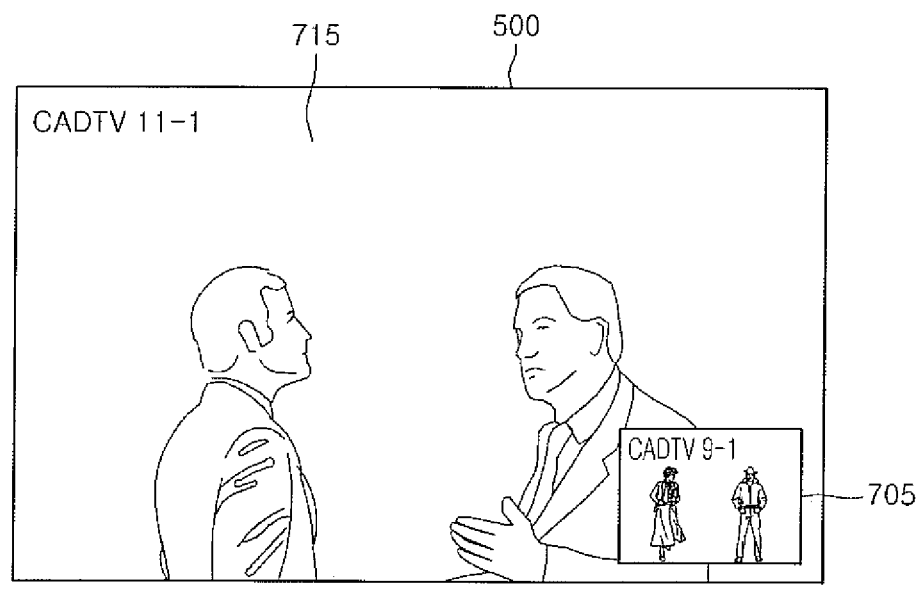

FIGS. 45 to 47 are diagrams illustrating a method for playing a plurality of channels in a program information window according to an embodiment. Referring to FIG. 45, a program information window displaying program information about respective channels receivable by the display device 100 may be displayed on a screen 500. The program information about the respective channels may be obtained from EPG information included in a broadcast signal received by the display device 100.

As illustrated in FIG. 45, the user may use an input device, for example, the spatial remote controller 301, to move the pointer 30 displayed on the screen 500, to select one of the channels included in the program information window. The user may use the spatial remote controller 301 to select program information corresponding to a desired channel and drag the same in a specific direction (represented by the dotted line box in FIG. 46).

For example, the user may select program information of a first channel, drag the same in a specific direction, and drop the dragged program information at a location of program information of a second channel to be viewed simultaneously with the first channel. In response to the drag and drop operation according to the use of the spatial remote controller 301 by the user, a video of the first channel and a video of the second channel may be simultaneously displayed on the screen 500.

More specifically, the user may detect or recognize the program information about the channels displayed in the program information window, detect or recognize the programs of the respective channels, and accordingly, choose or select to view a 'DTV 9-1' channel and a 'DTV 11-1' channel simultaneously. In this case, as illustrated in FIGS. 45 and 46, the user may drag program information 700 corresponding to the 'DTV 9-1' channel and drop the same in the display region of program information 710 corresponding to the 'DTV 11-1' channel. According to the input of the drag and drop operation into the display device, a video 705 of the 'DTV 9-1' channel and a video 715 of the 'DTV 11-1' channel may be simultaneously displayed on the screen 500, as illustrated in FIG. 47. As illustrated in FIG. 47, the video 705 of the 'DTV 9-1' channel corresponding to the dragged program information 700 may be displayed in the sub screen, and the video 715 of the 'DTV 11-1' channel corresponding to the program information 710 of the drop region may be displayed in the main screen.

Also, on the program information window illustrated in FIGS. 45 and 46, the above drag and drop operation may be used to perform various other functions, such as program recording or reservation. For example, the user may drag information corresponding to a first program among a plurality of programs displayed in the program information window and drop the same in the display region of information on a second program, to display the first and second programs on the screen 500 simultaneously at the program broadcast time.

More specifically, the user may drag information corresponding to an 'American Idol' program, which is to be broadcast in a 'DTV 7-1' channel, on the program information window and drop the same in the display region of information on a 'DTV 11-1' channel to perform a program reservation, so that the 'American Idol' program of the 'DTV 7-1' channel and a 'Come Here' program of the 'DTV 11-1' channel may be displayed on the screen 500 simultaneously at the program broadcast time, for example, at about 6:50 PM.

In addition to the above embodiments, the contents playing methods described with reference to FIGS. 8 to 34 may be performed in the program information window illustrated in FIG. 45.

The above contents playing methods may be performed by a 3D image display device. That is, a plurality of contents, for example, a plurality of broadcast channel images, described with reference to FIGS. 1 to 46 may be displayed on a screen in 3D images. The term '3D' is used to describe visual representation or display technology for playing 3D video with an optical illusion of depth. With respect to a left-eye image and a right-eye image, the visual cortex of an observer interprets the two images as one 3D image.

The 3D display technology may adopt 3D image processing and representing technology for 3D image display devices. A 3D image display device may also use a special observation device to effectively provide a 3D image to an observer.

Examples of the 3D image processing and representation include stereoscopic image/video capture, multiview image/video capture using a plurality of cameras, and 2D image/depth data processing. Examples of the 3D image display devices may include computer monitors, digital TV screens, and liquid crystal display (LCD) devices that have suitable hardware and/or software supporting 3D display technology. Examples of the special observation devices may include specialized glasses goggles, headgears, and eyewear.

Examples of the 3D image display technologies may include anaglyph stereoscopic images (generally used together with passive red/blue glasses), polarized stereoscopic images (generally used together with passive polarized glasses), alternate-frame sequencing (generally used active shutter glasses/headgears), and auto-stereoscopic display using lenticular or barrier screens.

According to one embodiment, a 3D image display technology may use a rotating or alternating optical device, for example, a segmented polarizer attached to a color filter wheel, which requires synchronization therebetween. Another 3D image display technology may use a digital light processor (DLP) based on a digital micro-mirror device (DMD) using rotary microscopic mirrors arranged in a tetragonal configuration corresponding to the pixels of a target display image.

New standards related to technologies for rendering and displaying stereoscopic images (particularly in 3D TVs) are being developed by various enterprises, consortiums and organizations, examples of which may include SMPTE (The Society Of Motion Picture And Television Engineers), CEA (Consumer Electronics Association), 3d@Home consortiums, and ITU (International Telecommunication Union). Examples of other standardization groups thereof may include DVB, BDA, ARIB, ATSC, DVD forums, and IEC. MPEG (Moving Picture Experts Group) is participating in 3D image coding of multiview images, stereoscopic images, and 2D images, and multiview video coding extension for MPEG-4 AVC (Advanced Video Coding) is being standardized. Stereoscopic image coding and stereoscopic distribution formatting are related to color shifting (anaglyph), pixel sub-sampling (side-by-side), checkerboard, quincunx, and enhanced video coding (2D+delta, 2D+metadata, and depth data).

Meanwhile, typical 2D image display devices may generate only one image. On the other hand, 3D image display devices may generate one 3D image using a left image and a right image.

Examples of methods for displaying left images and right images alternately for implementation of a 3D image may include a frame-by-frame segmentation method, a side-by-side segmentation method, and a top-down segmentation method. The frame-by-frame segmentation method may scan left images and right images alternately throughout a screen. The frame-by-frame segmentation method is also called a frame sequential method. That is, when displaying a left screen and a right screen alternately, the frame-by-frame segmentation method may use maximum resolution of a display device, which is called full resolution.

The side-by-side segmentation method may segment a screen horizontally to scan a left image and a right image separately on the screen. The top-down segmentation method may segment a screen vertically to scan a left image and a right image separately on the screen.

The above contents playing methods according to the embodiments may also be embodied as computer-readable codes on a computer-readable recording medium. The computer-readable recording medium may be any data storage device that stores data which may be thereafter read by a computer system Examples of a computer-readable recording medium may include a read-only memory (ROM), a random-access memory (RAM), a CD-ROM, a magnetic tape, a floppy disk, and an optical data storage device.

The computer-readable recording medium may be distributed over network-coupled computer systems, so that the computer-readable code may be stored and executed in a distributed fashion. Also, functional programs, codes, and code segments for accomplishing embodiments may be easily construed by programmers skilled in the art.

Additional details in regard to the thumbnail images and wireless remote may be found in U.S. application Ser. No. 12/651,730 filed Jan. 4, 2010, and U.S. application Ser. No. 12/647,231 filed Dec. 24, 2009, which are hereby incorporated by reference.

According to embodiments disclosed herein, a drag and drop input operation performed on a plurality of contents may be used to select and play two or more contents simultaneously, so that various contents input into a display device may be efficiently provided to a user in an interoperable manner.

Embodiments disclosed herein provide methods for playing a plurality of contents efficiently in an interoperable manner.

According to one embodiment disclosed herein, a method for playing contents is provided that may include displaying information corresponding, respectively, to a plurality of contents; receiving a drag and drop operation related to the first contents information and the second contents information among the displayed contents information, and playing the first contents and the second contents.

According to another embodiment disclosed herein, a method for playing contents is provided that may include displaying images corresponding, respectively, to a plurality of broadcast channels; receiving a drag and drop operation for dragging the first channel image among the displayed images to drop the dragged image in the display region of the second channel image, and playing the first and second channels on one screen simultaneously.

The above contents playing methods may be embodied as computer-readable codes on a computer-readable recording medium.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for displaying contents, the method comprising:
   displaying, on a display of a user device, a plurality of contents information corresponding, respectively, to a plurality of playable contents, wherein the plurality of contents information is information to identify, respectively, the plurality of playable contents, and wherein the plurality of contents information includes a first content information to identify a first playable a content and a second content information to identify a second playable content;
   receiving, on a touchscreen of the user device, a user input to drag and drop the first content information within a display region of the second content information, wherein the user input comprises:
      dragging the first content information towards the display region of the second content information; wherein the display region of the second content information is divided into a plurality of portions comprising: a top left portion, a top right portion, a bottom left portion and a bottom right portion; and
      dropping the first content information within a user selected one of the plurality portions of the display region of the second content information;
   in response to the user dropping the first content information within one of the plurality of portions of the display region of the second content information, displaying simultaneously the second playable content corresponding to the second content information in a main screen and the first playable content corresponding to the first content information in a sub screen overlaying the main screen, wherein the displaying the first playable content and the second playable content includes starting to play the first playable content and the second playable content, wherein the main screen is displayed in an entire region of the display, wherein the sub screen is smaller than the main screen, wherein a location of the sub screen on the display directly corresponds to the user selected portion at which the dragged first content information was previously dropped within the display region of the second content information such that the corresponding location of the sub screen on the display matches at least one of: top left of the display, top right of the display, bottom left of the display or bottom right of the display, and wherein the displayed size of the first playable content and the displayed size of the second playable content are simultaneously increased larger than the displayed size of the first content information and the displayed size of the second content information.

2. The method according to claim 1, further including:
selecting one of the first playable content or the second playable content; and
displaying the selected one of the first or second playable content in a full screen and stopping the display of the non-selected playable content.

3. The method according to claim 1, further including:
interchangeably displaying the displayed first playable content and the displayed second playable content, respectively, in the main screen and the sub screen.

4. The method according to claim 1, further including:
displaying a menu window that sets the sub screen; and
interchangeably displaying the playable content and the second playable content in the main screen and the sub screen or stopping the display of the sub screen, according to a user input for the displayed menu window.

5. The method according to claim 1, further including:
receiving a signal indicative of an operation for dragging the playable content displayed in the sub screen and to drop the dragged contents in a third region on the display, wherein the third region is a different location on the display than the current location of the sub screen; and
displaying the sub screen in the third region.

6. The method according to claim 1, further including:
dragging the first content information together with information associated with a third playable content and dropping both the first content information and the third content information in the display region of the second content information, and displaying the second playable content in the main screen and displayed the first playable content and the third playable content in sub screens.

7. The method according to claim 1, wherein the displaying the plurality of contents information corresponding to a plurality of playable contents includes displaying a plurality of videos corresponding, respectively, to the plurality of playable contents.

8. The method according to claim 1, wherein at least one of the plurality of playable contents includes a broadcast channel video.

9. A non-transitory computer-readable recording medium storing a program for executing the method of claim 1 in a computer.

10. A method for playing a plurality of broadcast channels, the method comprising:
displaying, on a display of a user device, a plurality of thumbnail images corresponding, respectively, to a plurality of broadcast channels, wherein the plurality of thumbnail images are images to identify, respectively, the plurality of broadcast channels, wherein the plurality of thumbnail images includes a first channel thumbnail image to identify a first broadcast channel and a second channel thumbnail image to identify a second broadcast channel;
receiving, on a touchscreen of the user device, a user input to drag and drop the first channel thumbnail image within a display region of the second channel thumbnail image, wherein the user input comprises:
dragging the first channel thumbnail image towards the display region of the second channel thumbnail image, wherein the display region of the second channel thumbnail image is divided into a plurality of portions comprising: a top left portion, a top right portion, bottom left portion and a bottom right portion; and
dropping the first channel thumbnail image within a user selected one of the plurality of portions of the display region of the second channel thumbnail image;
in response to the user dropping the first channel thumbnail image within one of the plurality of portions of the display region of the second channel thumbnail image, displaying simultaneously a first playable content corresponding to the first broadcast channel and a second playable content corresponding to the second broadcast channel, wherein the second playable content is displayed in a main screen and the first playable content is displayed in a sub screen overlaying the main screen, wherein the displaying the first playable content and the second playable content includes starting to play the first playable content and the second playable content, wherein the main screen is displayed in an entire region of the display, wherein the sub screen is smaller than the main screen, wherein a location of the sub screen on the display directly corresponds to the user selected portion at which the dragged first channel thumbnail image was previously dropped within the display region of the second channel thumbnail image such that the corresponding location of the sub screen on the display matches at least one of: top left of the display, top right of the display, bottom left of the display or bottom right of the display, and wherein the displayed size of the first playable content and the displayed size of the second playable content are simultaneously increased larger than the displayed size of the first channel thumbnail image and the displayed size of the second channel thumbnail image.

11. The method according to claim 10, further including:
interchangeably displaying the first and second playable contents corresponding to the first and second broadcast channels, respectively, in the main screen and the sub screen.

12. A non-transitory computer-readable recording medium storing a program for program for executing the method of claim 10 in a computer.

* * * * *